(12) United States Patent
Iida

(10) Patent No.: US 12,724,572 B2
(45) Date of Patent: Sep. 1, 2026

(54) IMAGE FORMING APPARATUS, METHOD OF CONTROLLING IMAGE FORMING APPARATUS, MANAGEMENT SERVER SYSTEM, METHOD OF CONTROLLING MANAGEMENT SERVER SYSTEM, INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Toshihiko Iida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 528 days.

(21) Appl. No.: 18/322,913

(22) Filed: May 24, 2023

(65) Prior Publication Data

US 2023/0401015 A1 Dec. 14, 2023

(30) Foreign Application Priority Data

Jun. 13, 2022 (JP) ................................. 2022-094986

(51) Int. Cl.
*G06F 3/12* (2006.01)

(52) U.S. Cl.
CPC .......... *G06F 3/1208* (2013.01); *G06F 3/1225* (2013.01); *G06F 3/1258* (2013.01); *G06F 3/1285* (2013.01)

(58) Field of Classification Search
CPC .... G06F 3/1208; G06F 3/1225; G06F 3/1258; G06F 3/1285
See application file for complete search history.

(56) References Cited

U.S. PATENT DOCUMENTS

2004/0021900 A1* 2/2004 Arakawa ............ G06K 15/1827 358/1.9
2022/0222023 A1* 7/2022 Kishi .................... G06F 3/1253

FOREIGN PATENT DOCUMENTS

JP 2014236477 A 12/2014

OTHER PUBLICATIONS

NPL: Results Publication Date Range: Jan. 8, 2004 to Jun. 19, 2025.*
NPL: InnovationQ+ by IP.com and IEEE: Results Publication Date Range: Feb. 5, 2004-Mar. 9, 2026.*

* cited by examiner

*Primary Examiner* — Quang N Vo
(74) *Attorney, Agent, or Firm* — ROSSI, KIMMS & McDOWELL LLP

(57) ABSTRACT

An image forming apparatus comprising: a print unit configured to perform print processing by using a color profile; a receiving unit configured to receive a message including a predetermined operation command related to a color profile, the message being sent from a management server system which executes color management between or among a plurality of image forming apparatuses, and being constructed in a common message format in the plurality of image forming apparatuses; and a processing unit configured to execute predetermined processing related to the color profile according to the predetermined operation command included in the message received by the receiving unit.

16 Claims, 22 Drawing Sheets

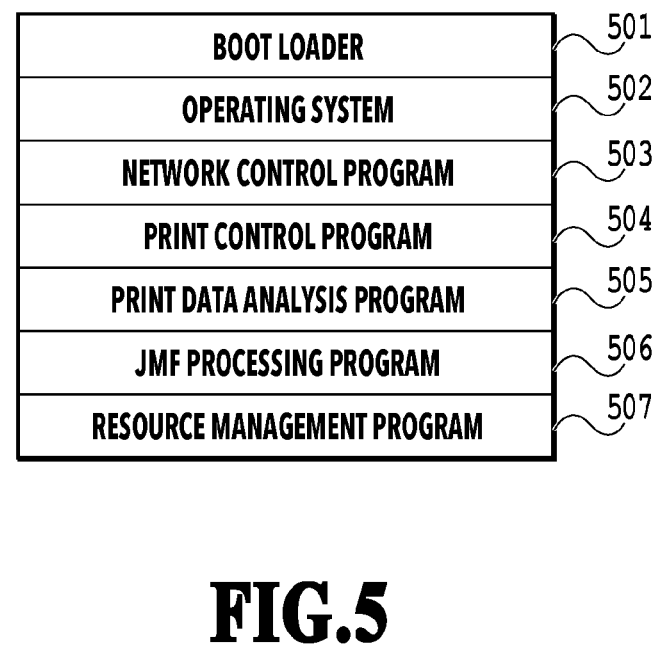

| | |
|---|---|
| BOOT LOADER | 501 |
| OPERATING SYSTEM | 502 |
| NETWORK CONTROL PROGRAM | 503 |
| PRINT CONTROL PROGRAM | 504 |
| PRINT DATA ANALYSIS PROGRAM | 505 |
| JMF PROCESSING PROGRAM | 506 |
| RESOURCE MANAGEMENT PROGRAM | 507 |

FIG.5

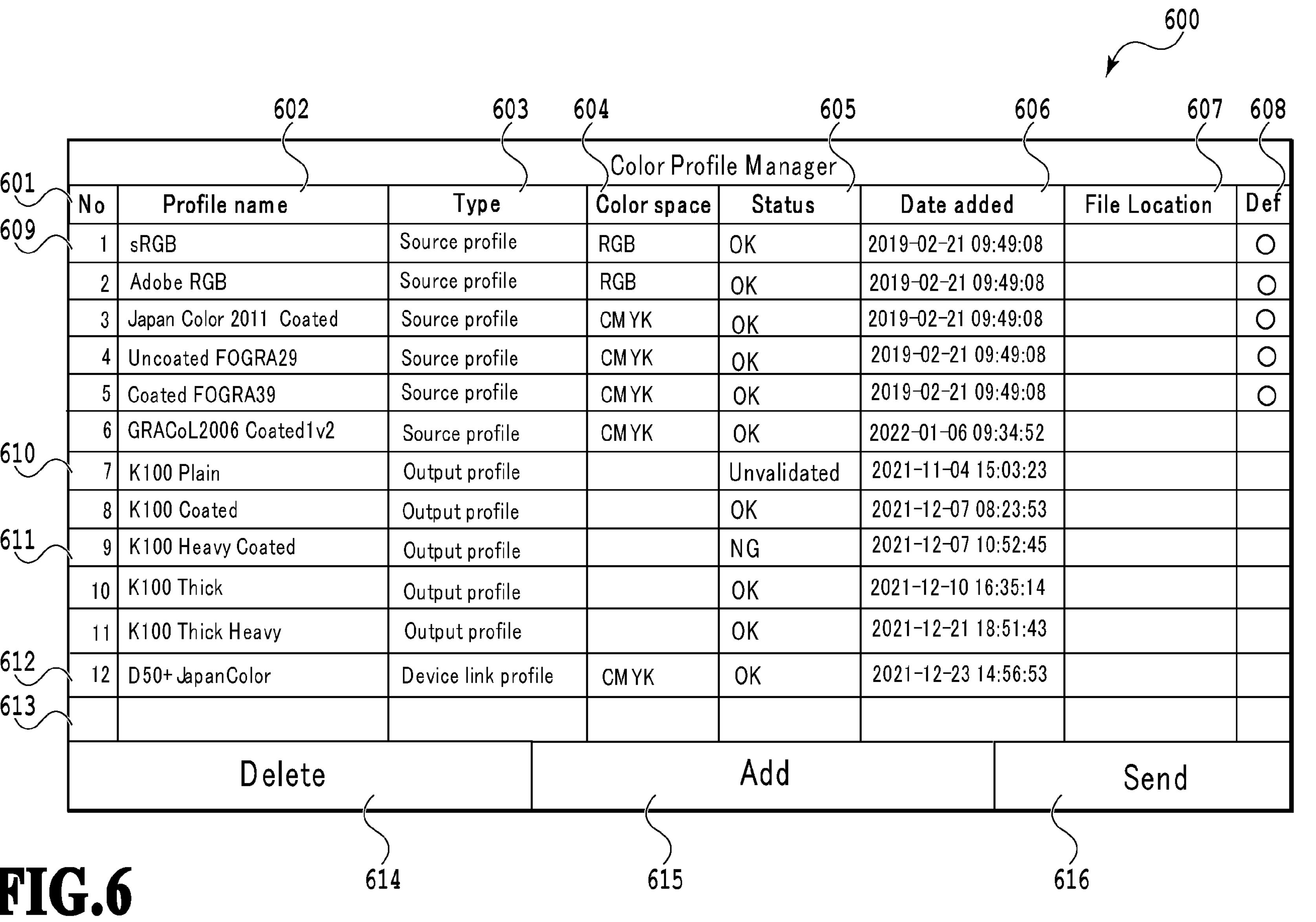

| No | Profile name | Type | Color space | Status | Date added | File Location | Def |
|---|---|---|---|---|---|---|---|
| 1 | sRGB | Source profile | RGB | OK | 2019-02-21 09:49:08 | | ○ |
| 2 | Adobe RGB | Source profile | RGB | OK | 2019-02-21 09:49:08 | | ○ |
| 3 | Japan Color 2011 Coated | Source profile | CMYK | OK | 2019-02-21 09:49:08 | | ○ |
| 4 | Uncoated FOGRA29 | Source profile | CMYK | OK | 2019-02-21 09:49:08 | | ○ |
| 5 | Coated FOGRA39 | Source profile | CMYK | OK | 2019-02-21 09:49:08 | | ○ |
| 6 | GRACoL2006 Coated1v2 | Source profile | CMYK | OK | 2022-01-06 09:34:52 | | |
| 7 | K100 Plain | Output profile | | Unvalidated | 2021-11-04 15:03:23 | | |
| 8 | K100 Coated | Output profile | | OK | 2021-12-07 08:23:53 | | |
| 9 | K100 Heavy Coated | Output profile | | NG | 2021-12-07 10:52:45 | | |
| 10 | K100 Thick | Output profile | | OK | 2021-12-10 16:35:14 | | |
| 11 | K100 Thick Heavy | Output profile | | OK | 2021-12-21 18:51:43 | | |
| 12 | D50+JapanColor | Device link profile | CMYK | OK | 2021-12-23 14:56:53 | | |
| | | | | | | | |

| ID | File | Status | StatusDetails | DateAdded | Default | Name | Type | ColorSpace | ElapsedTime |
|---|---|---|---|---|---|---|---|---|---|
| CP0012345 | /root/resource/colorprofile/data01.icc | Available | | 2019/02/21 09:49:08+09:00 | TRUE | sRGB | Source profile | RGB | |
| CP0012346 | /root/resource/colorprofile/data02.icc | Available | | 2019/02/21 09:49:08+09:00 | TRUE | Adobe RGB | Source profile | RGB | |
| CP0012347 | /root/resource/colorprofile/data03.icc | Available | | 2019/02/21 09:49:08+09:00 | TRUE | Japan Color 2011 Coated | Source profile | CMYK | |
| CP0012348 | /root/resource/colorprofile/data04.icc | Available | | 2019/02/21 09:49:08+09:00 | TRUE | Uncoated FOGRA29 | Source profile | CMYK | |
| CP0012349 | /root/resource/colorprofile/data05.icc | Available | | 2019/02/21 09:49:08+09:00 | TRUE | Coated FOGRA39 | Source profile | CMYK | |
| CP0012350 | /root/resource/colorprofile/data06.icc | Available | | 2022/01/06 09:34:52+09:00 | FALSE | GRACoL2006 Coated1v2 | Source profile | CMYK | |
| CP0012351 | /root/resource/colorprofile/data07.icc | Unavailable | Unvalidated | 2021/11/04 15:03:23+09:00 | FALSE | K100 Plain | Output profile | | 0 |
| CP0012352 | /root/resource/colorprofile/data08.icc | Available | | 2021/12/07 08:23:53+09:00 | FALSE | K100 Coated | Output profile | | 2323 |
| CP0012353 | /root/resource/colorprofile/data10.icc | Available | | 2021/12/10 16:35:14+09:00 | FALSE | K100 Thick | Output profile | | 12394 |
| CP0012354 | /root/resource/colorprofile/data11.icc | Available | | 2021/12/21 18:51:43+09:00 | FALSE | K100 Thick Heavy | Output profile | | 24854 |
| CP0012355 | /root/resource/colorprofile/data12.icc | Available | | 2021/12/23 14:56:53+09:00 | FALSE | D50+JapanColor | Device link profile | CMYK | 56234 |
| CP0012356 | /root/resource/colorprofile/data13.icc | Unavailable | Incomplete | 2022/01/19 11:38:10+09:00 | FALSE | | | | |
| | | | | | | | | | |
| | | | | | | | | | |

Column reference numerals: 901 (ID), 902 (File), 903 (Status), 904 (StatusDetails), 905 (DateAdded), 906 (Default), 907 (Name), 908 (Type), 909 (ColorSpace), 920 (ElapsedTime). Row reference numerals: 910, 911, 912, 913.

| DeviceID (1501) | IP (1502) | GetColorProfileInfo (1503) Operation (1504) | Port (1505) | AddColorProfile (1506) Operation (1507) | Port (1508) | DeleteColorProfile (1509) Operation (1510) | Port (1511) |
|---|---|---|---|---|---|---|---|
| K100-343485 (1512) | http://192.168.11.13 | JMF | 8010 | JMF | 8010 | JMF | 8010 |
| K120-423145 (1513) | http://192.168.11.14 | Http-Get | 31001 | Http-Post | 31001 | - | - |
| NX-6600 (1514) | http://192.168.11.15 | Http-Get | 8080 | - | - | - | - |
| DTU 1000 | http://192.168.11.16 | API:GetProfile | 25400 | API:AddProfile | 25400 | API:DeleteProfile | 25400 |
| EW-2300 (1515) | http://192.168.11.17 | command¥GetProfileInfo.bat | - | command¥AddProfile.bat | - | command¥DelProfile.bat | - |

FIG.15

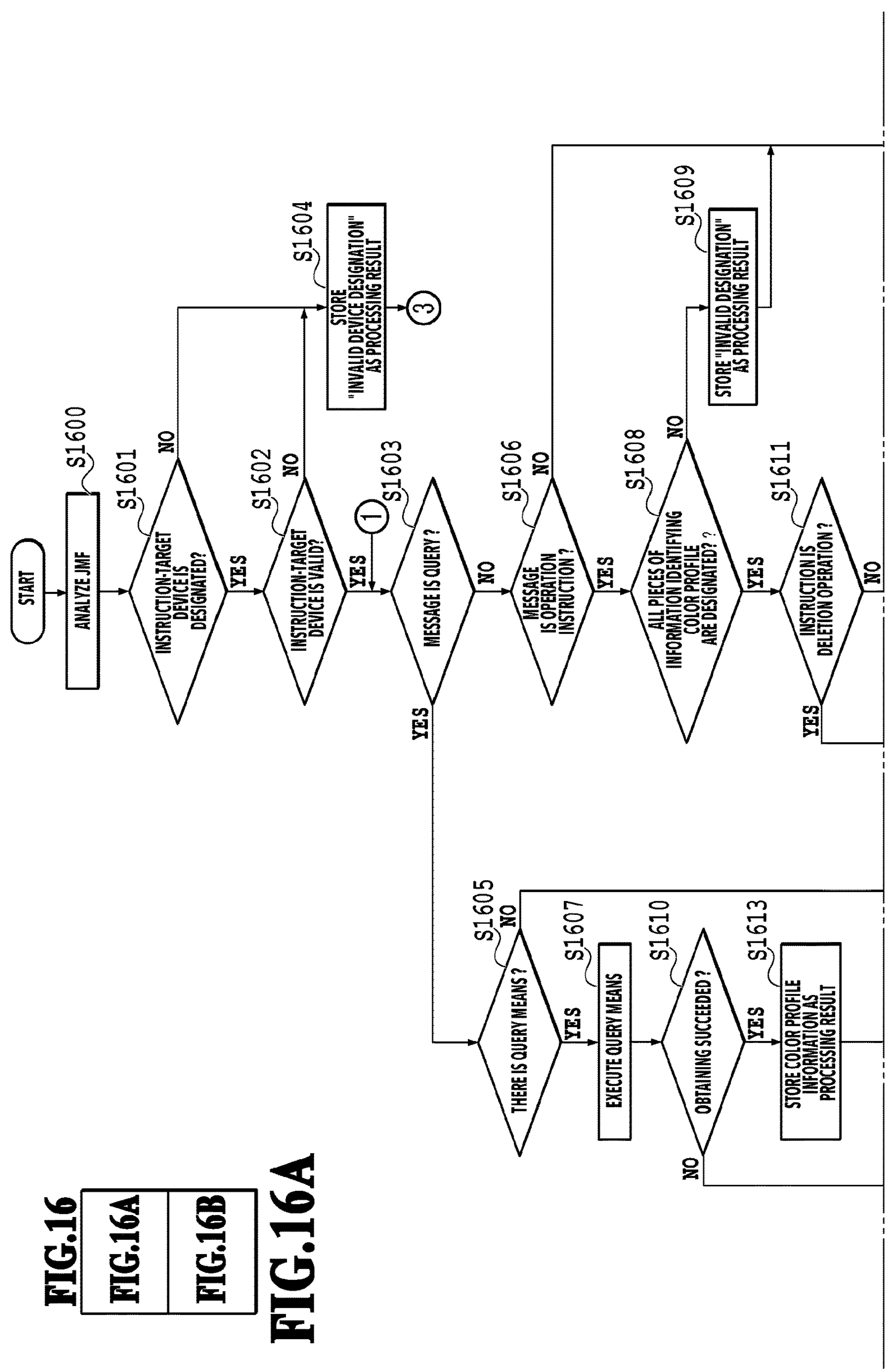
FIG.16
FIG.16A
FIG.16B
FIG.16A
START
ANALYZE JMF
S1600
S1601
INSTRUCTION-TARGET DEVICE IS DESIGNATED?
NO
YES
S1602
INSTRUCTION-TARGET DEVICE IS VALID?
NO
YES
S1604
STORE "INVALID DEVICE DESIGNATION" AS PROCESSING RESULT
3
1
S1603
MESSAGE IS QUERY ?
NO
YES
S1606
MESSAGE IS OPERATION INSTRUCTION ?
NO
YES
S1608
ALL PIECES OF INFORMATION IDENTIFYING COLOR PROFILE ARE DESIGNATED? ?
NO
YES
S1609
STORE "INVALID DESIGNATION" AS PROCESSING RESULT
S1611
INSTRUCTION IS DELETION OPERATION ?
NO
YES
S1605
THERE IS QUERY MEANS ?
NO
YES
S1607
EXECUTE QUERY MEANS
S1610
OBTAINING SUCCEEDED ?
NO
YES
S1613
STORE COLOR PROFILE INFORMATION AS PROCESSING RESULT

IMAGE FORMING APPARATUS, METHOD OF CONTROLLING IMAGE FORMING APPARATUS, MANAGEMENT SERVER SYSTEM, METHOD OF CONTROLLING MANAGEMENT SERVER SYSTEM, INFORMATION PROCESSING APPARATUS, METHOD OF CONTROLLING INFORMATION PROCESSING APPARATUS, AND STORAGE MEDIUM

BACKGROUND OF THE DISCLOSURE

Field of the Disclosure

The present disclosure relates to a technique for managing color profiles in a unified manner by a common method.

Description of the Related Art

Large-scale printing companies hold plural sites and have plural printing apparatuses at each site. The printing apparatuses at different sites are required to maintain color reproducibility by using color profiles. Japanese Patent Laid-Open No. 2014-236477 (hereinafter referred to as Document 1) discloses a system in which a correction profile considering spectral characteristics of a scanner used for color verification is sent to each device from a color verification system.

The system according to Document 1 can perform a correction considering the spectral characteristics of the scanner, but cannot manage the color profile of each device in a unified manner.

SUMMARY OF THE DISCLOSURE

An image forming apparatus according to the present disclosure includes: a print unit configured to perform print processing by using a color profile; a receiving unit configured to receive a message including a predetermined operation command related to a color profile, the message being sent from a management server system which executes color management between or among a plurality of image forming apparatuses, and being constructed in a common message format in the plurality of image forming apparatuses; and a processing unit configured to execute predetermined processing related to the color profile according to the predetermined operation command included in the message received by the receiving unit.

Further features of the present disclosure will become apparent from the following description of exemplary embodiments with reference to the attached drawings.

BRIEF DESCRIPTION OF THE DRAWINGS

FIG. 5 is a diagram of a software configuration of the image forming apparatuses;

FIG. 6 is a schematic diagram of a color profile management screen by the information processing apparatus on the management system side;

FIG. 9 is a schematic diagram of a resource management table created by a resource management program;

FIG. 14 is a diagram of a software configuration of the information processing apparatus on the image forming apparatus side;

FIG. 15 is a schematic diagram of a table storing instructions for image forming apparatuses;

DESCRIPTION OF THE EMBODIMENTS

Figure 1:
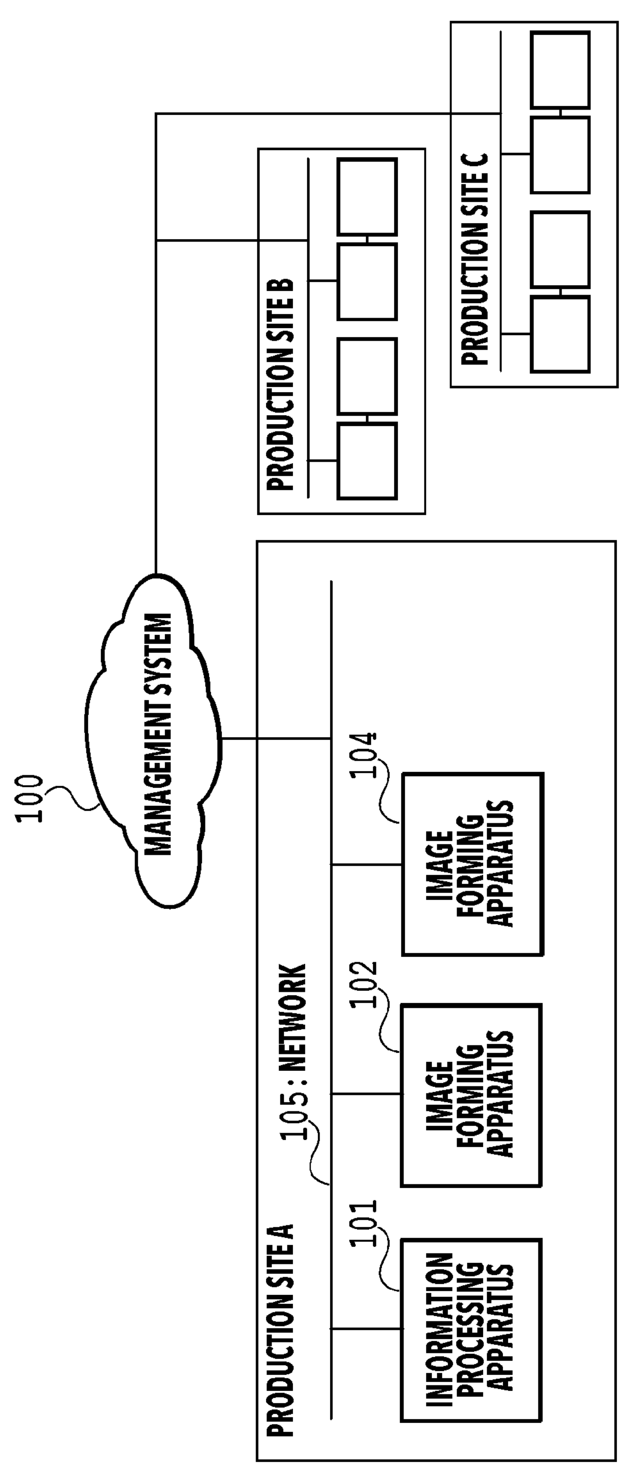
FIG. 1 is a diagram illustrating an example of the system configuration of a system according to the present disclosure.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals.

First Embodiment

<System Configuration in First Embodiment>

FIG. 1 illustrates a diagram of a system configuration in a first embodiment of the present disclosure. The system configuration in the present embodiment includes a management system 100, an information processing apparatus 101, and image forming apparatuses 102, 104. The management system 100, the information processing apparatus 101, and the image forming apparatuses 102, 104 are connected to one another through a network 105. The management system 100 performs color management between or among the plural image forming apparatuses. The management system 100 may have a management server therein. Hence, the above system will also be referred to as "management server system". Here, the information processing apparatus 101 and the image forming apparatuses 102, 104 belong to a production site A. The management system 100 is a cloud service to which other production sites B and C each having a similar configuration to the production site A are also connected, and which manages color states of the image forming apparatuses at the plural production sites. The production sites described herein may be production sites of a single printing company or production sites of plural printing companies as long as they are configured to be connectable to the management system 100. The information processing apparatus 101 performs management of the image forming apparatuses 102, 104, input of print jobs, and so on.

In the following description, an example in which the plural image forming apparatuses are present is described. A system configuration with the management system 100, the information processing apparatus 101, and the image forming apparatus 102 can also implement the functions to be implemented in the following description.

Processing of printing a color chart and measuring the colors of color patches will be referred to herein as "color adjustment" processing. The "color adjustment" processing includes color verification processing of verifying the tint of the image forming apparatus, color profile creation processing of creating a color profile for color adjustment, and so on. Each image forming apparatus 102, 104 analyzes print data sent from the information processing apparatus 101 or the like, converts the print data into a dot image on a per-page basis, and prints the dot images. A finisher that performs post-processing such as stapling, punching, folding, bookbinding, and cutting on a printed product can be mounted to the image forming apparatus 102, 104, and the image forming apparatus 102, 104 can perform printing as well as outputting a printed product after performing various types of post-processing. Moreover, an optional unit equipped with a scanner that obtains image data on a print surface and an in-line sensor that obtains color information of a color chart can be mounted to the image forming apparatus 102, 104.

In the present embodiment, an example in which two information processing apparatuses and two image forming apparatuses are connected is presented, but the configuration is not limited to this configuration. Also, the configuration may be such that print data is sent from the management system to the image forming apparatuses and apparatus information is sent from the image forming apparatuses to the management system without being passed through an information processing apparatus that serves as a print controller. The management system may be an on-premises type that is implemented with an information processing apparatus at a printing site, instead of a cloud service. Also, two image forming apparatuses are connected to the information processing apparatus in the present embodiment, but only one image forming apparatus may be connected to the information processing apparatus.

<Hardware Configuration of Image Forming Apparatuses>

Figure 2A:
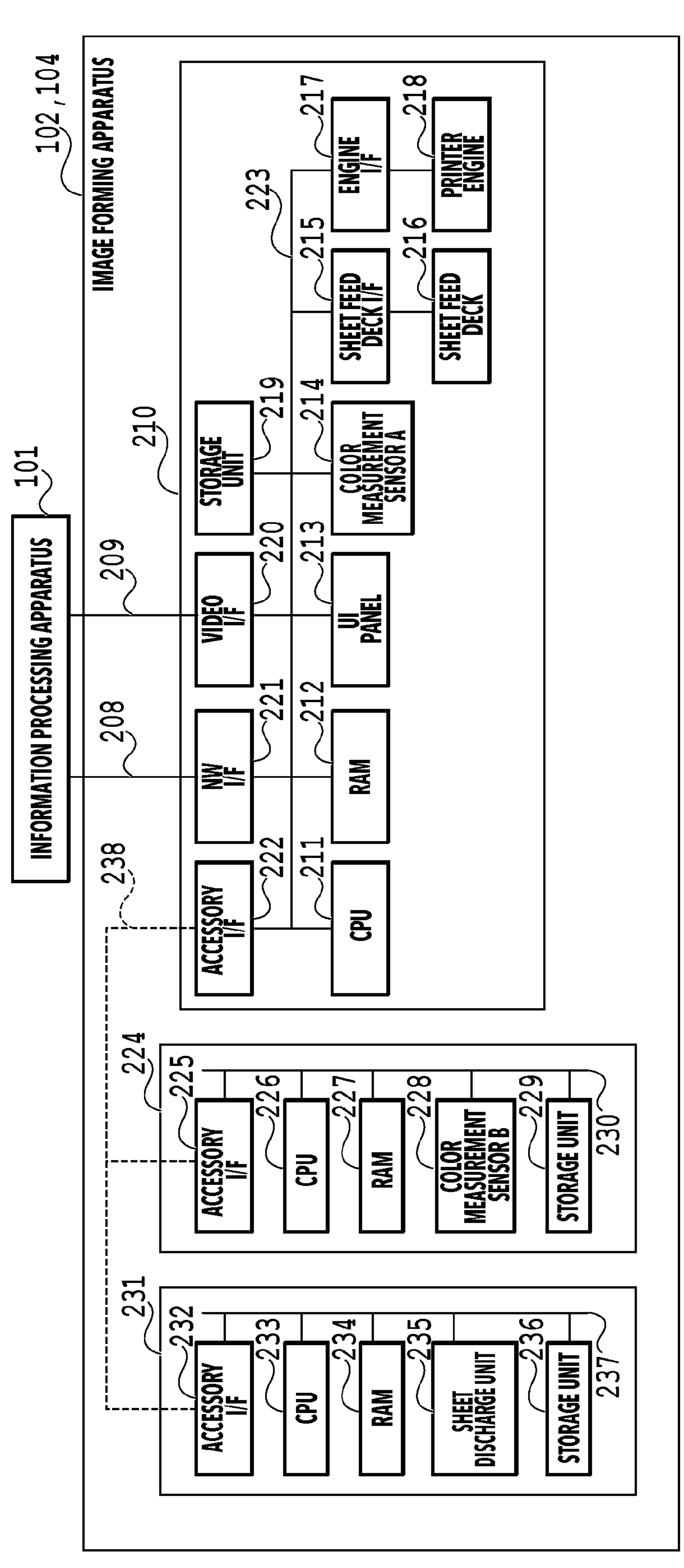
FIG. 2A is a hardware configuration diagram of image forming apparatuses.

FIG. 2A is a block diagram illustrating a hardware configuration of the image forming apparatuses 102, 104.

Each image forming apparatus includes a central processing unit (CPU) 211, a random access memory (RAM) 212, an user interface (UI) panel 213, a color measurement sensor A 214, a sheet feed deck interface (I/F) 215, an engine I/F 217, a storage unit 219, a video I/F 220, a network (NW) I/F 221, and an accessory I/F 222.

The CPU 211 performs control of elements in a print module 210 and calculation through a system bus 223. The CPU 211 executes programs stored in the storage unit 219 and loaded to the RAM 212. The RAM 212 is a common type of volatile storage device which can be accessed directly from the CPU 211, and is used as a work area for the CPU 211 or as a temporary data storage area. The storage unit 219 functions as a temporary storage area and a work memory during operation of the print module 210.

The color measurement sensor A 214 is an in-line sensor disposed over a sheet conveyance path in the print module 210. The color measurement sensor A 214 is a spectroscopic sensor that measures the colors of patches on a color chart to obtain color information. The color measurement sensor A 214 is plural sensors (the same number of sensors as the number of columns in a patch layout) disposed over the sheet conveyance path, and measures the colors of color patches printed on a sheet. Thus, the color measurement processing is performed with the sensor at a fixed position. In this way, it is possible to perform printing without lowering the print speed. On the other hand, the color measurement accuracy of the color measurement sensor A 214 is lower than that of a later-described color measurement sensor B 228 due to the individual differences among the plural sensors.

The engine I/F 217 communicates with and controls a printer engine 218. The sheet feed deck I/F 215 communicates with and controls a sheet feed deck 216. The sheet feed deck 216 collectively represents plural sheet feed decks (not illustrated) as hardware components. The UI panel 213 is a user interface for performing general operations on the print module 210.

The NW I/F 221 is connected to the information processing apparatus 101 through a cable 208 and allows communication between the print module 210 and the information processing apparatus 101. In the present embodiment, the configuration is such that the interfaces connected to the system bus 223 are directly connected to one another. However, the configuration may be such that the information processing apparatus 101 and the print module 210 are connected through a network, for example, and the form of connection is not limited. The video I/F 220 communicates image data between the information processing apparatus 101 and the print module 210 through a video cable 209.

The accessory I/F 222 is connected to accessory I/Fs 225, 232 through a cable 238. Specifically, the print module 210 performs mutual communication with a sensor unit 224 and a sheet discharge unit 231 through the accessory I/Fs 222, 225, 232.

A CPU 226 performs control of elements in the sensor unit 224 and calculation through a system bus 230 and executes programs stored in a storage unit 229 and loaded to a RAM 227. The RAM 227 is a common type of volatile storage device which can be accessed directly from the CPU 226, and functions as a work area for the CPU 226 or as a temporary data storage area.

The color measurement sensor B 228 is an in-line sensor disposed over a sheet conveyance path in the sensor unit 224. The color measurement sensor B 228 is a spectroscopic sensor that measures the colors of color patches on a color chart to obtain color information. The color measurement sensor B 228 is used to measure the colors of patches on a color chart together with the color measurement sensor A 214 mentioned above. Any type of sensor is usable as long as it can accomplish this object. Unlike the above color measurement sensor A 214, the color measurement sensor B 228 is a single sensor disposed over the sheet conveyance path, and measures the colors of color patches by moving over the sheet in the main scanning direction itself. In this way, there is no individual differences among sensors, so that the color measurement accuracy is higher than that of the above color measurement sensor A 214, but the color measurement speed is lower than that of the color measurement sensor A 214.

A CPU 233 performs control of elements in the sheet discharge unit 231 and calculation through a system bus 237 and executes programs stored in a storage unit 236 and loaded to a RAM 234. The RAM 234 is a type of temporary volatile storage device which can be accessed directly from the CPU 233, and is used as a work area for the CPU 233 or as a temporary data storage area. A sheet discharge unit 235 performs an operation of discharging sheets onto a main tray and a top tray as well as monitoring and controlling the stacking of sheets on the main tray and the top tray.

Figure 2B:
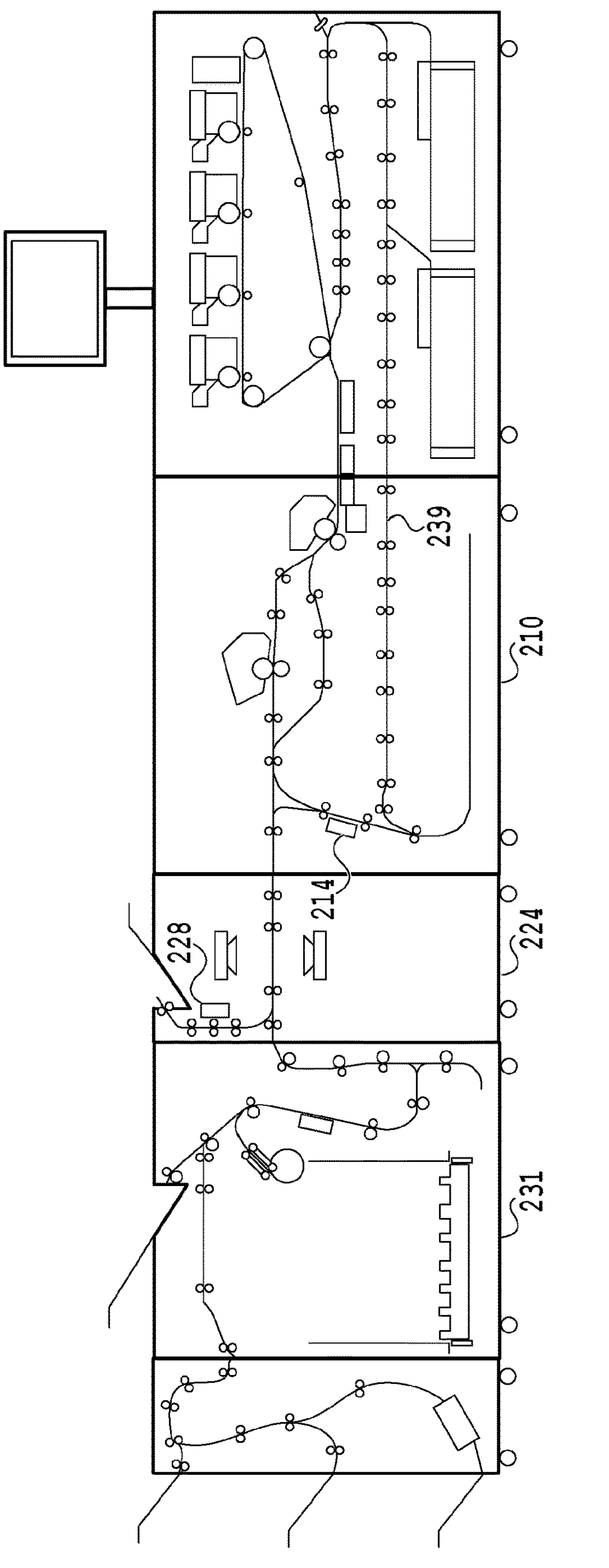
FIG. 2B is a cross-sectional view of the image forming apparatuses.

FIG. 2B illustrates an exemplary cross-sectional view of the image forming apparatuses 102, 104 in the present embodiment. The color measurement sensor A 214 is disposed over a sheet conveyance path 239 in the print module 210, and the color measurement sensor B 228 is disposed over the sheet conveyance path in the sensor unit 224. The color measurement sensor A 214 is disposed near a sheet reversal path, and there is limitation that the color measurement sensor A 214 measure colors in a case where the sheet size is large (a long sheet or the like) or the sheet is thick paper. Also, as described earlier, the color measurement sensor A 214 measures colors with its sensors fixed over the sheet conveyance path. Thus, there is limitation that, in a case of a small sheet, color patches cannot be arranged at the sensor's reading position and therefore their colors cannot be measured.

<Hardware Configuration of Information Processing Apparatuses>

Figure 3:
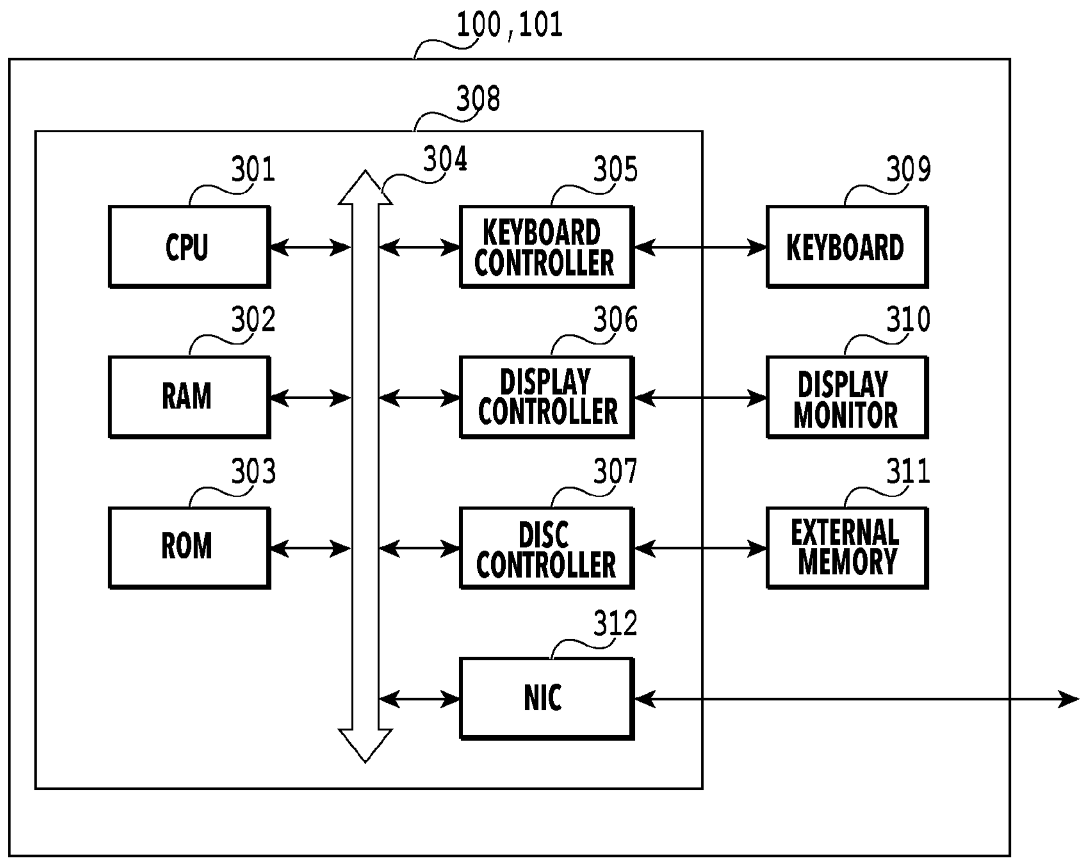
FIG. 3 is a diagram of a hardware configuration of an information processing apparatus on a management system side and an information processing apparatus on the image forming apparatus side.

FIG. 3 is a block diagram illustrating a hardware configuration of an information processing apparatus that operates in the management system 100 and the information processing apparatus 101 at the production site A.

In FIG. 3, a CPU 301 executes the programs of an operating system (OS) and general applications stored in a program ROM in a ROM 303 or loaded from an external memory 311 to a RAM 302. The RAM 302 functions as a main memory, a work area, and the like for the CPU 301. A keyboard controller 305 controls inputs from a keyboard 309 and a pointing device (not illustrated). A display controller 306 controls the display on the display monitor 310. A disc controller 307 controls access to the external memory 311, which stores a boot program, various applications, font data, and so on, and the like. A network interface controller (hereinafter referred to as "NIC") 312 is connected to a network and executes processing of controlling communication with other apparatuses connected to that network. A bus 304 connects the CPU 301 to the RAM 302, the ROM 303, various controllers, and so on and transfers data signals and control signals.

In a case of a mobile terminal, a touch panel controller or the like may be included in the configuration in place of the keyboard controller 305. Moreover, a large-capacity storage device may be included in place of the external memory 311. Furthermore, the internal configuration of the NIC 312 varies depending on whether the system includes a wired local area network (LAN), a wireless LAN, or both. Nonetheless, differences originating from these internal configurations are absorbed in the NIC 312, and the NIC 312 functions to control the system as an equivalent NIC to the other modules illustrated in FIG. 3. Also, the NIC 312 may be plural modules.

<Software Configuration of Information Processing Apparatuses>

Figure 4A:
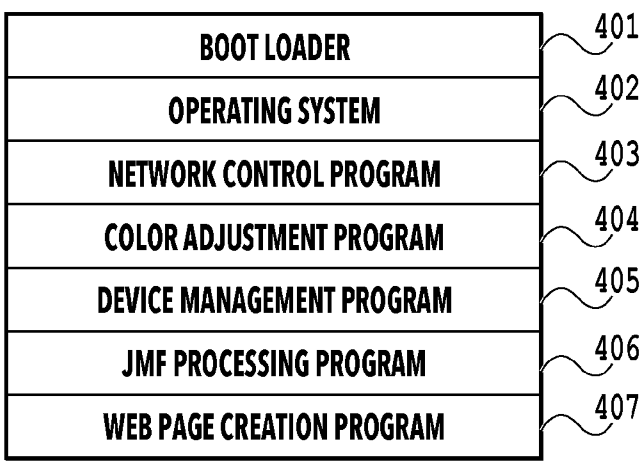
FIG. 4A is a diagram of a software configuration of the information processing apparatus on the management system side.
Figure 4B:
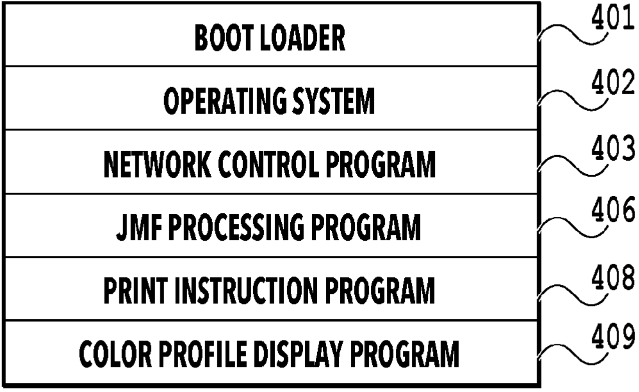
FIG. 4B is a diagram of a software configuration of the information processing apparatus on the image forming apparatus side.

FIG. 4A illustrates a software configuration of the information processing apparatus that operates in the management system 100. FIG. 4B illustrates a software configuration of the information processing apparatus 101 on the image forming apparatuses 102, 104 side at the production site A.

First, the software configuration of the information processing apparatus that operates in the management system 100 will be generally described.

A boot loader 401 is a program to be executed immediately after the power supply is turned on. This program includes a program for executing various activation sequences necessary for activating the system.

An operating system 402 is a program intended to provide an environment for executing various programs that implement various functions. This provides functions such as management of resources such as the memories of the information processing apparatus, i.e., the ROM 303, the RAM 302, and the external memory 311.

A network control program 403 is a program to be executed in a case of sending and receiving data to and from apparatuses connected through a network. Specifically, the network control program 403 is a piece of software which controls the NIC 312 and is used in a case of sending and receiving data and files to and from external apparatuses through the network 105.

A color adjustment program 404 performs the processing of generating a color adjustment job for performing color adjustment and sending it to the image forming apparatuses 102, 104, and the processing of analyzing and verifying color information obtained from the image forming apparatuses 102, 104 and managing their color states.

A device management program 405 manages information on various devices forming the image forming apparatuses 102, 104. Examples of the information include the number of sheet feed decks of the print module 210, the name of each sheet feed deck, information on whether the color measurement sensor A 214 is mounted, and so on. The device management program 405 also manages the mounting status of an optionally mounted sensor unit 224, information on whether the color measurement sensor B 228 is mounted in the sensor unit 224, and so on.

A job messaging format (JMF) processing program 406 analyzes JMFs received from the image forming apparatuses 102, 104 and creates JMFs to be sent to the image forming apparatuses 102, 104. In the present embodiment, color profile operation instructions (operation commands) such as instructions to obtain, delete, register, and update information on color profiles are all issued using JMFs. The instructions are issued by operating buttons on a screen displayed by a web page creation program 407 or a color profile display program 409. Operations on color profiles and created JMFs will be described using FIGS. 7A to 7C.

The web page creation program 407 is a program for generating a web page for executing the color adjustment processing to be described later. The web page creation program 407 also generates a web page for displaying information on color profiles obtained from the image forming apparatuses 102, 104. The generated web pages are accessed from a web browser on the information processing apparatus operated by the user.

Next, a software configuration of the information processing apparatus 101 on the image forming apparatuses 102, 104 side illustrated in FIG. 4B will be generally described.

Description of the boot loader 401, the operating system 402, the network control program 403, and the JMF processing program 406 will be omitted since they have been described for the software configuration of the information processing apparatus that operates in the management system 100.

A print instruction program 408 is a program for issuing print instructions to the image forming apparatuses 102, 104. The data format of the print instructions is not particularly limited since it does not affect the present embodiment.

The color profile display program 409 is a program that displays information on color profiles obtained from the image forming apparatuses 102, 104. The screen to be displayed by the color profile display program 409 is the same as the one by the web page creation program 407.

<Software Configuration of Image Forming Apparatuses>

FIG. 5 illustrates a software configuration of the image forming apparatuses 102, 104.

A boot loader 501 is a program to be executed immediately after the power supply is turned on. This program includes a program for executing various activation sequences necessary for activating the system.

An operating system 502 is a program intended to provide an environment for executing various programs that implement the functions of the image forming apparatus 102, 104. The operating system 502 mainly provides functions such as basic input-output control of the RAM 212, the storage unit 219, and other elements of the image forming apparatus.

A network control program 503 is a program to be executed in a case of sending and receiving data to and from apparatuses connected through the network 105. The network control program 503 is used in the processing of receiving files to be printed, sending of data from external apparatuses, and sending and receiving of commands. The network control program includes a driver program for controlling the NW I/F 221.

A print control program 504 is a program for the processing received print jobs. Basic operation of the print control program 504 is as follows. The print control program 504 stores pieces of job data received from the NW I/F 221 into the storage unit 219, and holds the reception order. The print control program 504 instructs a controller unit to execute print processes based on the above reception order. Moreover, in order to stop or resume execution of print jobs, the print control program 504 accepts actuation or de-actuation of a queue itself from the UI panel 213 and executes the processing based on the accepted instruction. Furthermore, the print control program 504 performs the processing of returning the status of the job queue in response to a query from an external apparatus. The status of the job queue includes a state where the job queue is stopped and a state where the job queue is executed as well as a state where a job or jobs are present, a state where no job is present, and the like, and the status of the job queue is sent to the external apparatus through the NW I/F 221.

A print data analysis program 505 receives print data through the NW I/F 221 and executes the processing of loading the print data in response to an instruction to analyze the print data from the print control program 504. After completing the loading processing, the print data analysis program 505 sequentially instructs devices to operate in the above reception order by the CPU 211 based on a processing order managed by the print control program 504. As a result, the software of the image forming apparatus 102, 104 executes control so as to finally execute the page description language (PDL) processing. The above devices include the sheet feed deck 216, the printer engine 218, the storage unit 219, the RAM 212, and so on.

A JMF processing program 506 is a program that analyzes and performs appropriate processing on JMF data received through the network 105, and creates a JMF describing the processing result and the like. In the present embodiment, the JMF processing program 506 obtains information on color profiles registered in the image forming apparatus 102, 104 and deletes, registers, and updates color profiles by JMFs. JMFs to be actually sent and received will be described using FIGS. 7A to 7C.

The resource management program 507 is a program for the image forming apparatus 102, 104 to manage resources to be used in various processes. The resource management program 507 manages files of fonts, color profiles, and the like stored in the storage unit 219 of the image forming apparatus 102, 104 and renders necessary programs referable as needed. The resource management program 507 also performs various processes related to management of resources such as addition of a new resource, deletion of a stored resource, registration and update related information, and determination of whether to permit or not to permit use of the related information.

<Schematic Diagram of Color Profile Management Screen>

FIG. 6 illustrates a schematic diagram of the color profile management screen 600 as one of the web pages created by the web page creation program 407 of the management system 100. The screen created by the color profile display program 409 of the information processing apparatus 101 at the site A is similar as well. The color profile management screen 600 is displayed by selecting a color profile management screen display button (not illustrated) and issuing an instruction to obtain registered color profile information.

A color profile display screen 601 is formed of a region to display a list of registered color profiles obtained from one of the management-target image forming apparatuses, and a region to display instruction buttons for addition, deletion, and sending. The following description will be given with the image forming apparatus 102 as the management-target image forming apparatus. The same procedure is followed also in a case where the management-target image forming apparatus is the image forming apparatus 104.

First, details of the color profile display screen 601 will be described.

A color profile name display region 602 is a region to display names of the color profiles. In a case of designating a color profile to be used, the name of the color profile is used. In a case of registering a color profile, its name of the color profile is an essential item.

A color profile type display region 603 is a region to display the types of the color profiles. Color profile types include a source profile, an output profile, and a device link profile. Also, the color profile display screen 601 may be such that color correspondence data for color matching in which specific colors and output colors are associated can be managed in a similar manner. In a case of registering a color profile, the type of the color profile is an essential item.

A color profile color space display region 604 is a region to display the color spaces for the color profiles. The color spaces are RGB, CMYK, and the like. A color space is given in a case where the type of the color profile is a source profile or a device link profile. For example, in a case where a color profile is one without a value representing a color space, such as an output profile, a blank is given.

A color profile status display region 605 is a region to display the statuses of the color profiles. The color profile statuses include at least a value representing an available state and a value representing an unavailable state. In the present embodiment, the value representing an unavailable state includes a value indicating that color verification has not been performed for a predetermined time period or longer, and a value indicating that the color reproducibility has been found problematic in color verification. The values in the color profile status display region 605 can be updated by selecting desired values. In a case where the operator (administrator user) updates a status and presses a send button 616, a status update instruction is sent to the image forming apparatus 102.

A color profile registration date and time display region 606 is a region to indicate that the color profiles have been registered in the image forming apparatus 102. Each value is automatically set at the time of creation, and cannot be explicitly designated by issuing a registration instruction.

A color profile address selection region 607 is a region to designate the sources from which color profiles to be registered in the image forming apparatus 102 is obtained. In the color profile address selection region 607, no value is set for color profiles already registered in the image forming apparatus 102. The color profile address selection region 607 is an essential item in a case of registering a color profile in the image forming apparatus 102. Specifically, in a case of registering a color profile, a registration instruction will not be executed for this color profile to be newly registered if no address is input in the address selection region 607 in a newly registered color profile selection region 613.

A default registration display region 608 is a region to indicate whether the color profiles have been registered in the image forming apparatus 102 since the time of shipment. Commonly used source profiles generally tend to be registered in the image forming apparatus 102 since the time of shipment. The color profiles registered since the time of shipment cannot be deleted by the deletion operation to be described later.

The registered color profiles listed in the color profile management screen 600 in FIG. 6 have been obtained from a resource management table 900 in the image forming apparatus 102 to be described later. Details of registered information on registered color profiles 609, 610, 611, 612 will be described below.

The registered color profile 609 represents a color profile of which the name is “sRGB”, the type is “Source profile”, the status is “Available”, and the registration date is “Feb. 21, 2019, 09:49:08”, and which has been registered since the time of shipment. The registered color profile 610 represents a profile of which the name is “K100 Plain” and the type is “Output profile” and which is unavailable since color verification has not been performed for a predetermined time period. The registered color profile 611 represents a profile of which the name is “K100 Heavy Coated” and the type is “Output profile”. The registered color profile 611 is unavailable since its color reproducibility is problematic in color verification. The registered color profile 612 indicates that the name of “D50+JapanColor”, the type is “Device link profile”, and the color space is CMYK.

The newly registered color profile selection region 613 is a region for selecting a color profile which the image forming apparatus 102 is to be instructed to newly register, and inputting values. This region is created in a case where the operator presses an add button 615. A single region can designate a single color profile, and plural regions can be created by pressing the add button 615 plural times. The color profile name display region 602, the color profile type display region 603, and the address selection region 607 are items that must always be designated or input. In a case where there is an item that has not been input, no registration instruction will be executed for that newly registered color profile selection region 613. The color profile color space display region 604 is an item that must be designated in a case where the color profile type display region 603 holds a source profile or a device link profile. Clicking the color profile name display region 602 enables input of characters from an operation unit as the name of a color profile. Clicking the color profile type display region 603 and the color profile color space display region 604 displays pull-down menus, from which values can be selected. In a case where a type without a color space is designated in the color profile type display region 603, a value selected in the color profile color space display region 604 will not be used. Selecting the color profile address selection region 607 enables selection of a file or input of a uniform resource locator (URL). Pressing the send button 616 after inputting and selecting all items will send a later-described profile registration instruction to the image forming apparatus 102. The image forming apparatus 102, which is the sending destination, is an image forming apparatus having obtained the registered color profiles that are displayed.

A delete button 614 is a button for issuing an instruction to delete a color profile(s). The registered color profiles displayed in the color profile display screen 601 are selectable. Pressing the delete button 614 after selecting a color profile will record it as a color profile for which a deletion instruction will be executed. In a case where the operator then presses the send button 616, a later-described message containing the deletion instruction is sent to the image forming apparatus 102.

The add button 615 is a button to be used to newly register a color profile. In a case where the operator presses the add button 615, the newly registered color profile selection region 613 is generated in the color profile management screen 600 in FIG. 6.

The send button 616 is a button for sending an instruction. In a case where the delete button 614 or the add button 615 has been selected, and the instruction to delete or add the color profile has been made, or in a case where the change has been made to the color profile status display region 605, the color profile operation instruction is sent to the image forming apparatus 102. The data to be sent will be described with reference to FIGS. 7A to 7C. In a case where there is no instruction or change, a message containing the instruction to obtain the registered color profiles is sent to the image forming apparatus 102. The color profile display screen 601 is updated based on information on the registered color profiles contained in responses to the instructions.

<Schematic Diagrams of Data to be Sent and Received>

Figure 7A:
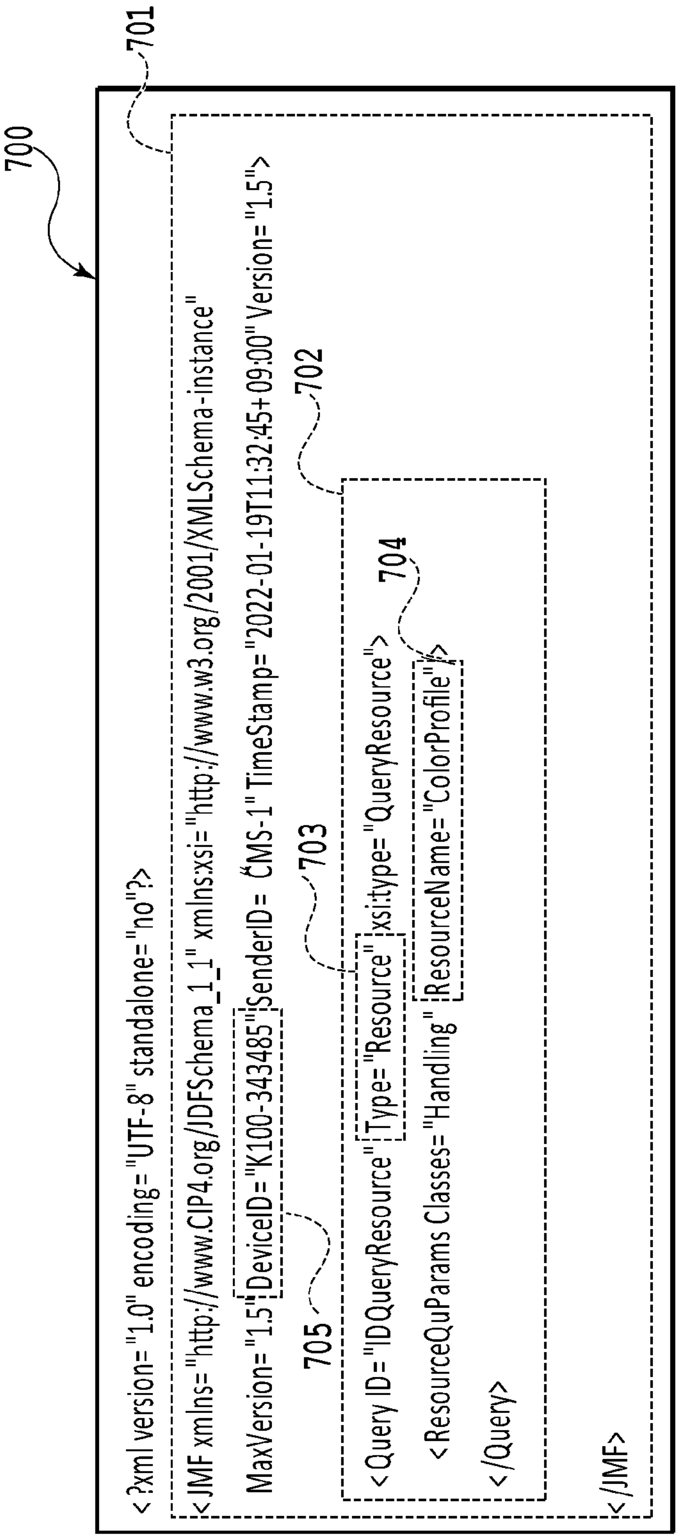
FIG. 7A is a schematic diagram of data sent and received between the information processing apparatus on the management system side and the image forming apparatus.
Figure 7B:
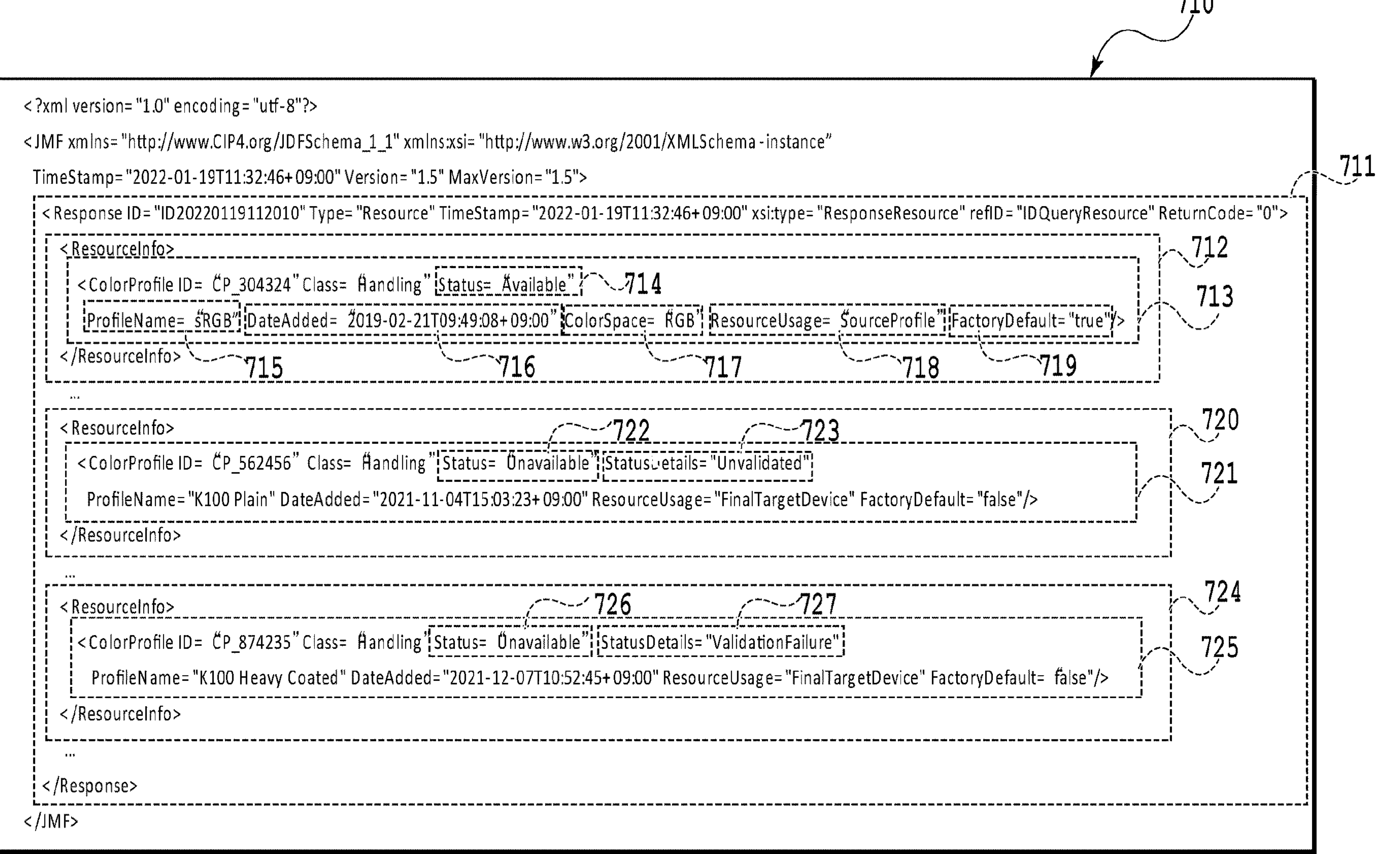
FIG. 7B is a schematic diagram of data sent and received between the information processing apparatus on the management system side and the image forming apparatus.
Figure 7C:
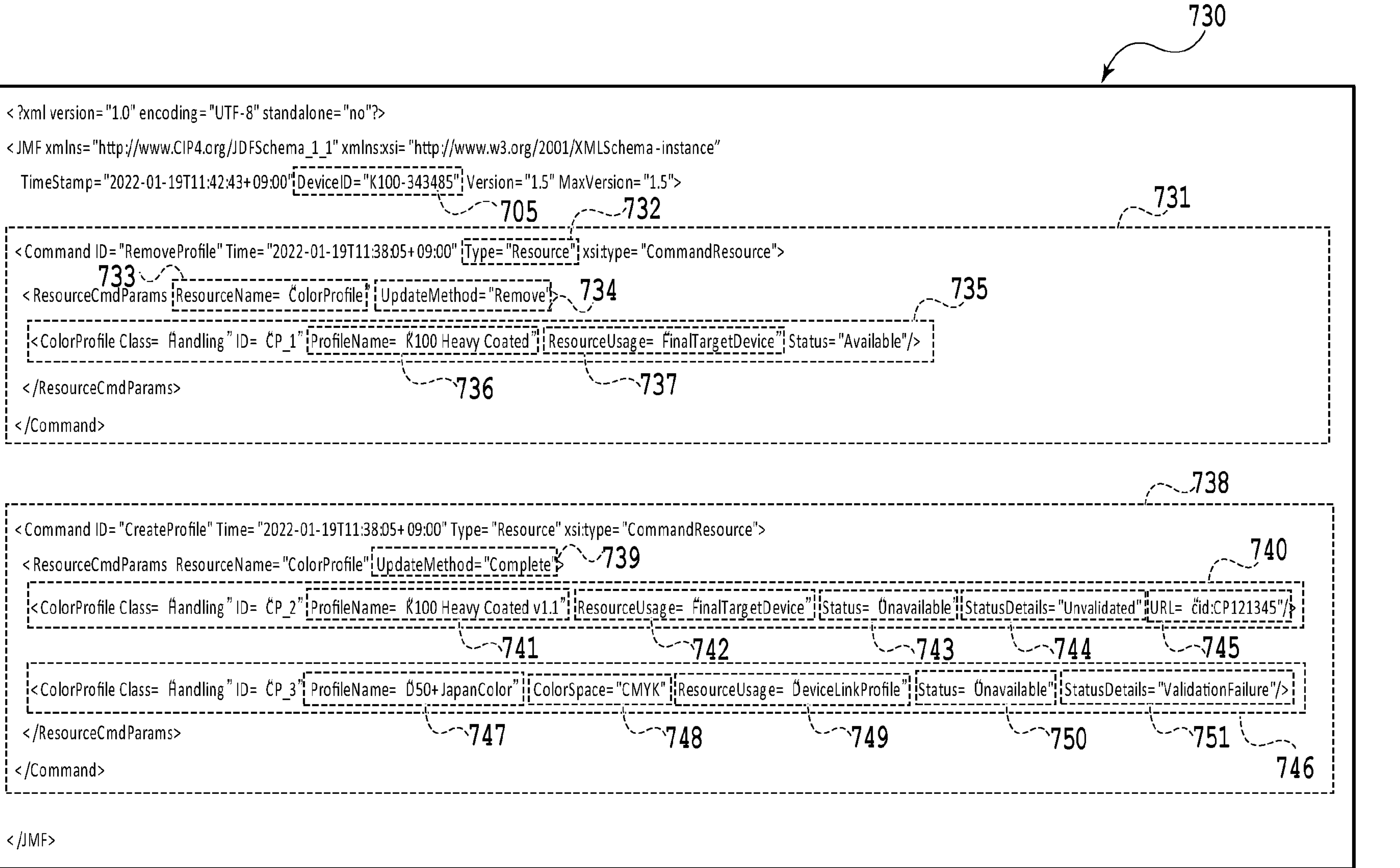
FIG. 7C is a schematic diagram of data sent and received between the information processing apparatus on the management system side and the image forming apparatus.

FIGS. 7A to 7C represent an example of data for color profile management to be sent and received among the management system 100, the information processing apparatus 101, and the image forming apparatus 102. FIG. 7A represents a color profile query JMF 700 for obtaining information on color profiles registered in the image forming apparatus 102. FIG. 7B represents a response JMF 710 to the color profile query containing information on the color profiles registered in the image forming apparatus 102. FIG.

7C represents an operation instruction JMF 730 for instructing the image forming apparatus 102 to delete, register, and update color profiles.

The color profile query JMF 700 represents data in a case of making a color profile query by using a JMF being a commonly used format for communication between the management system 100 and the image forming apparatus 102.

Detail of elements in the color profile query JMF 700 in FIG. 7A will be described below.

A JMF element 701 is the top element in the color profile query JMF 700. The JMF element 701 contains the elements representing the contents of a message.

A Query element 702 represents the message in the JMF. The Query element 702 is used in a case of making a query to the receiver. The type of the query target is designated with a Type attribute 703, and the detail of the target is designated with a ResourceName attribute 704. In response to receiving the color profile query JMF 700, the JMF processing program 506 of the image forming apparatus 102 analyzes the JMF element 701 from the top. By analyzing the JMF element 701 in this fashion, it is understood that the received JMF is a query JMF and that the contents of the query are ColorProfile as one type of Resource.

A DeviceID element 705 is an attribute containing an identifier identifying the destination device to which this JMF is sent. Incidentally, in the present embodiment, processing using the DeviceID element 705 will not be described, and detailed description of the DeviceID element 705 will therefore be omitted.

The response JMF 710 to a color profile query is created as below. The JMF processing program 506 of the image forming apparatus 102 having received the color profile query JMF 700 obtains color profile information in the resource management table 900 from the resource management program 507 to create the response JMF 710. The response JMF 710 is an example of data to be returned to the sender of the query.

The response JMF 710 to the color profile query contains Response 711 as a message.

ResourceInfo 712, ResourceInfo 720, and ResourceInfo 724 are areas to contain obtained information on Resources, and created for respective Resources. Each ResourceInfo contains a ColorProfile element 713, 721, 725 containing information on a color profile. In the example of FIG. 7B, the ResourceInfo 712 corresponds to the color profile 609 in FIG. 6, the ResourceInfo 720 corresponds to the color profile 610 in FIG. 6, and the ResourceInfo 724 corresponds to the color profile 611 in FIG. 6. The ColorProfile elements 713, 721, 725 contain information on the corresponding color profiles.

Status attributes 714, 722, 726 are attributes for indicating the statuses of the color profiles represented by the respective ColorProfile elements. Since the color profile 609 is available, "Available" indicating that the color profile is available is set in the Status attribute 714. Since the color profiles 610, 611 are unavailable, "Unavailable" indicating that the color profile is unavailable is set in the Status attributes 722, 726. In a case where the Status attribute is "Unavailable", the reason why the color profile is unavailable is set in StatusDetails attributes 723, 727. The value "Unvalidated" in the StatusDetails attribute 723 indicates that color verification has not been performed for a predetermined time period or longer. The value "ValidationFailure" in the StatusDetails attribute 727 indicates that the color reproducibility has been found insufficient in color verification. In a case where the management system 100 receives the response JMF illustrated in FIG. 7B, the management system 100 displays the statuses determined from the values of the Status attributes and the values of the StatusDetails attributes in the response JMF in the color profile status display region 605 in FIG. 6.

A Profile attribute 715 is an attribute indicating the name of a profile. The value of the Profile attribute 715 is displayed in the color profile name display region 602 in FIG. 6.

A DateAdded attribute 716 is an attribute indicating the date and time of registration of the profile in the printing apparatus. In a case where the management system 100 receives the response JMF illustrated in FIG. 7B, the management system 100 displays a date and time determined from the value of the DateAdded attribute 716 in the response JMF in the color profile registration date and time display region 606 in FIG. 6.

A ColorSpace attribute 717 is an attribute indicating the color space used by the color profile. In a case where the management system 100 receives the response JMF illustrated in FIG. 7B, the management system 100 displays a color space determined from the value of the ColorSpace attribute 717 in the response JMF in the color profile color space display region 604 in FIG. 6.

A ResourceUsage attribute 718 is an attribute for indicating the type of the color profile. In a case where the management system 100 receives the response JMF illustrated in FIG. 7B, the management system 100 displays the value of a color profile type determined from the ResourceUsage attribute 718 in the response JMF in the color profile type display region 603 in FIG. 6.

A FactoryDefault attribute 719 is an attribute for indicating whether the color profile has been registered since the time of shipment. In a case where the management system 100 receives the response JMF illustrated in FIG. 7B, the management system 100 displays a value determined from the FactoryDefault attribute 719 in the response JMF in the default registration display region 608 in FIG. 6.

The operation instruction JMF 730 is data for instructing the image forming apparatus 102, 104 to execute operations performed on color profiles on the color profile management screen 600 in FIG. 6. In response to pressing the send button 616, the data represented by the operation instruction JMF 730 is sent to the image forming apparatus 102, 104. The contents of the operation instruction JMF 730 change with operations performed on the color profile management screen 600 in FIG. 6. The example of FIG. 7C indicates that the following operations have been performed on the color profile management screen 600 in FIG. 6. First, the operator selects the color profile 611 in FIG. 6 and presses the delete button 614. Next, the operator presses the add button 615 and inputs the information on a color profile indicated by a ColorProfile element 740 in the newly registered color profile selection region 613. The ColorProfile element 740 in FIG. 7C represents an example in which "K100 Heavy Coated v1.1" is input in the color profile name display region 602, and an output profile is selected in the color profile type display region 603. After completing the above input, the operator presses the send button 616. Incidentally, in a case of newly registering a color profile, "NO" is set as an initial value in the color profile status display region 605 since color verification has not been completed for this color profile.

Command elements 731, 738 indicate messages in the JMF. The command elements 731, 738 are used in a case of executing operation instructions. In the example of FIG. 7C, two operations are designated. The type of an operation target is designated with a Type attribute 732, and the detail of the target is designated with a ResourceName attribute 733. Here, since an operation is to be performed on a color profile, the Type attribute 732 is Resource, and the ResourceName attribute 733 is ColorProfile.

UpdateMethod attributes 734, 739 are attributes designating how to perform an update by an operation. Since the Command element 731 designates a deletion operation, "Remove" representing deletion is set. Since the Command element 738 designates registration-update operations, "Complete" representing overwrite is set.

ProfileName attributes 736, 741, 747 are each an attribute designating the name of a color profile, and is one of attributes that designates a color profile to be subjected to a deletion, registration, or update operation. In a case where the image forming apparatus 102 receives the operation instruction JMF 730 illustrated in FIG. 7C, the image forming apparatus 102 performs none of the operations if no value is designated in the ProfileName attribute.

ResourceUsage attributes 737, 742, 749 are each an attribute designating the type of a color profile, and is one of attributes that designates a color profile to be subjected to a deletion, registration, or update operation. In a case where the image forming apparatus 102 receives the operation instruction JMF 730 illustrated in FIG. 7C, the image forming apparatus 102 performs none of the operations if no value is designated in the ResourceUsage attribute.

A ColorSpace attribute 748 is an attribute that designates the color space of a color profile, and is an attribute that needs to be designated in a case where the type of the color profile is a source profile or a device link profile. In a case where the image forming apparatus 102 receives the operation instruction JMF 730 in FIG. 7C, the image forming apparatus 102 performs none of the operations if the type of the color profile is a source profile or a device link profile and no value is designated in the ColorSpace attribute.

Status attributes 743, 750 and StatusDetails attributes 744, 751 are attributes designating the statuses of color profiles to be registered or updated. The statuses set in the color profile status display region 605 are set as the Status attributes 743, 750 and the StatusDetails attributes 744, 751. The operation instruction JMF 730 with the Status attributes and the StatusDetails attributes set therein is sent to the image forming apparatus 102. The correspondence among the statuses, the Status attributes 743, 750, and the StatusDetails attributes 744, 751 has been set forth in the description of the response JMF in FIG. 7B.

A URL attribute 745 is an attribute designating the address of the data of a color profile to be registered. The URL attribute 745 is an attribute that needs to be designated in a case of registration. In a case where it is not designated, executed will be an instruction to update the status of an existing color profile. In the example of FIG. 7C, cid is used to designate the data. Besides this, a protocol such as http, file, or smb can be used to designate the data. The data must be at a place accessible by the image forming apparatus 102, or the receiver. In a case where the image forming apparatus 102 receives the operation instruction JMF 730 illustrated in FIG. 7C, then, if an address is designated in the URL attribute, the image forming apparatus 102 obtains the data of the color profile from the designated address.

Color profiles are identified by combining the three types of attributes of the ProfileName attribute 736, 741, 747, the ResourceUsage attribute 737, 742, 749, and the ColorSpace attribute 748. Even in a case where the values of the ProfileName attributes 736, 741, 747 are the same, the color profiles will be handled as different ones if their values of another attribute are different. In a case of deletion or update, the above three types of attributes must match those of a registered color profile. In a case where the URL attribute 745 is designated, then, if the combinations of all three match each other, the color profile is replaced. Otherwise, a color profile is newly registered.

In the example of FIG. 7C, an instruction to perform single deletion, registration, and update operations is given. However, an instruction to perform plural deletion, registration, and update operations can be given at the same time. In a case of giving an instruction to delete plural color profiles, plural ColorProfile elements 735 are described. In a case of giving an instruction to register or update plural color profiles, plural ColorProfile elements 740, 746 are described. Color profiles to be subjected respectively to deletion, registration, and update operations are processed in the order in which they are described. In a case where the order of execution is important, the order of execution can be designated by arranging the Command elements 731, 738 and the ColorProfile element 735, 740, 746 in the desired order of execution.

<Flow of Processing in Case of Receiving Data on Color Profile Management>

Figure 8:
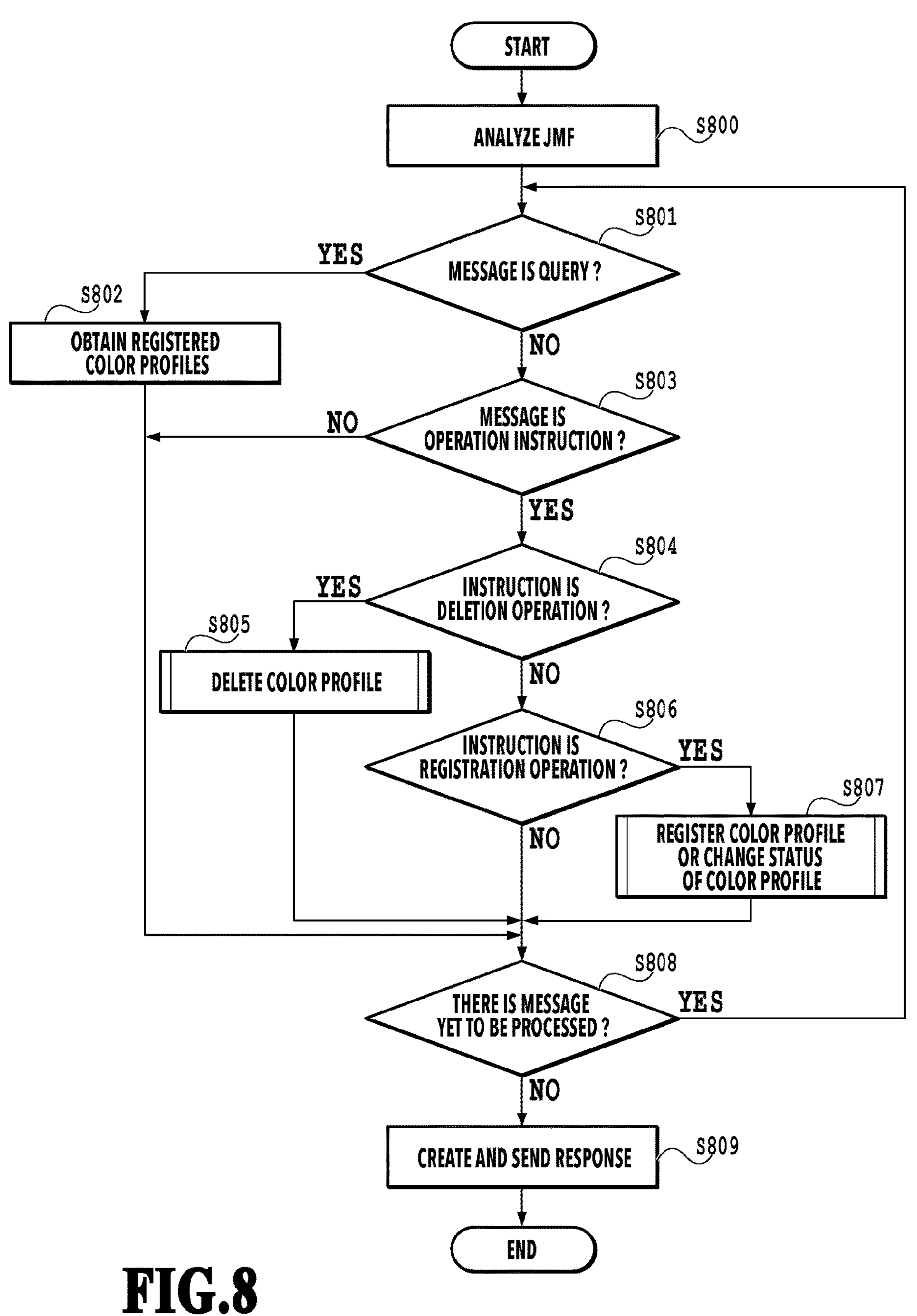
FIG. 8 is a flowchart illustrating processing in a case of receiving color profile management data.

FIG. 8 illustrates a flowchart explaining a flow of processing by the CPU 211 of the image forming apparatus 102, 104 in a case of receiving the color profile query and operation instructions described with reference to FIGS. 7A to 7C. The following description will be given on the assumption that the image forming apparatus is the image forming apparatus 102. The operations in the image forming apparatus 104, which will not be described, are the same as the operations in the image forming apparatus 102.

The CPU 211 performs the series of processes illustrated in the flowchart of FIG. 8 by executing a program stored in the storage unit 219 and loaded to the RAM 212. Alternatively, the functions of some or all of the steps in FIG. 8 may be implemented with hardware such as an application-specific integrated circuit (ASIC), a field-programmable gate array (FPGA), or an electronic circuit. Meanwhile, the symbol "S" in the description of each process means a step in the flowchart. The above also applies to the flowcharts of FIGS. 10 and 11.

The CPU 211 executes the processes by instructing the JMF processing program 506. In response to receiving data, the JMF processing program 506 analyzes the received data. Whether the received data is a JMF can be determined based on whether the JMF element 701 is in the root element.

In S800, the CPU 211 analyzes the received JMF. Since the JMF is in the Extensible Markup Language (XML) format, it may be analyzed from the top element according to the hierarchical structure, as in normal XML analysis. After the CPU 211 completes the analysis of the JMF, the processing proceeds to S801.

The processes of S801 to S808 are performed as many times as the number of messages designated in the JMF. In a case where the CPU 211 has not processed all messages, the processing proceeds from S808 to S801, and the CPU 211 continues the processes starting from S801.

In S801, the CPU 211 determines whether the message in the JMF is a color profile query. As described with reference to FIGS. 7A to 7C, the CPU 211 can determine whether the message in the received JMF is a color profile query based on whether a lower element in the JMF element 701 is the Query element 702. Also, whether the query target is color profiles can be determined by checking whether the Type attribute 703 is "Resource" and the ResourceName attribute 704 is "ColorProfile". If the CPU 211 determines that the message is a query, the processing proceeds to S802. If the CPU 211 determines that the message is not a query, the processing proceeds to S803.

In S802, the CPU 211 obtains information on registered color profiles from the resource management program 507. The color profile information is held in the resource management table 900 illustrated in FIG. 9, which is included in the resource management program 507. The resource management table 900 stores the names, types, and color spaces of the color profiles. The resource management table 900 also stores the relations of the color profile data written to the storage unit 219 by the resource management program. The resource management table 900 will be described with reference to FIG. 9 to be mentioned later. The information obtained in the present embodiment includes at least the names, types, and color spaces of the color profiles, which are information that identifies the color profiles, as well as statuses indicating the color profiles are available. In the present embodiment, the CPU 211 also obtains information indicating whether the profiles have been registered since the time of shipment. The CPU 211 stores the obtained information in the storage unit 219, and the processing proceeds to S808.

In S803, the CPU 211 determines whether the message in the JMF is an operation instruction for a color profile. The CPU 211 can determine whether the message in the JMF is an operation instruction for a color profile based on whether a lower element in the JMF element 701 is the Command element 731, 738. The method of determining the operation instruction target is the same as S801. In a case where the CPU 211 determines that the message is an operation instruction, the processing proceeds to S804. In a case where the CPU 211 determines that the message is not an operation instruction, the processing proceeds to S808.

In S804, the CPU 211 determines whether the received operation instruction is a deletion operation. The CPU 211 can determine whether the operation instruction is a deletion operation based on whether the UpdateMethod attribute 734, 739 is "Remove". In a case where the CPU 211 determines that the operation instruction is a deletion operation, the processing proceeds to S805. In a case where the CPU 211 determines that the operation instruction is a deletion operation, the processing proceeds to S806.

In S805, the CPU 211 performs processing of deleting a color profile. Details of the color profile deletion processing will be described later using FIG. 10. After the CPU 211 completes the color profile deletion processing, the processing proceeds to S808.

In S806, the CPU 211 determines whether or not the operation instruction is registration processing or update processing (registration/update processing). The CPU 211 can determine whether the operation instruction is a registration operation based on whether the UpdateMethod attribute 734, 739 is "Complete". In a case where the CPU 211 determines that the operation instruction is registration/update processing, the processing proceeds to S807. In a case where the CPU 211 determines that the operation instruction is not registration/update processing, the processing proceeds to S808.

In S807, the CPU 211 performs the processing of registering or updating a color profile. Details of the color profile registration/update processing will be described using FIGS. 11A and 11B. After the CPU 211 completes the color profile registration/update processing, the processing proceeds to S808.

In S808, the CPU 211 determines whether there is a message yet to be processed. In a case where the CPU 211 determines that there is a message yet to be processed, the processing proceeds to S801. In a case where the CPU 211 determines that there is no message yet to be processed, the processing proceeds to S809.

In S809, the CPU 211 creates a response based on the stored processing result. The response JMF 710 to a color profile query is an example of the response, and is a response created by the CPU 211 from the processing result stored in S802. After creating a response, the CPU 211 sends response data to the sender of the JMF, and finishes the flow illustrated in FIG. 8.

<Schematic Diagram of Resource Management Table>

FIG. 9 illustrates the resource management table 900 created and managed by the resource management program 507 of the image forming apparatus 102, 104. The resource management table 900 stores information such as the locations of the data of registered color profiles and the names and types of the profiles. In S802, the resource management program 507 returns the data of the resource management table 900. The example of FIG. 9 is a screen displayed in a case where an operation is performed on the color profile management screen 600, the deletion, registration, and update instructions in FIG. 7C are sent to the image forming apparatus, and the CPU 211 performs deletion, registration, or update processing on the ColorProfile element 740.

ID 901 is an identifier uniquely identifying a resource. In a case where a resource is created, the resource management program 507 allocates a unique value to the resource. In a case where a color profile is created, an ID 901 is allocated to the color profile when it is stored in the storage unit 219 in S1115.

File 902 is information identifying the location of the resource on the storage unit 219. In S1115, the address of the destination to which to write the resource is stored. The write destination is determined by the resource management program 507, and registered in the resource management table 900 in association with the value of the ID 901 determined likewise by the resource management program 507.

Status 903 and StatusDetails 904 are information indicating the status of the resource. In the present embodiment, values are stored which are determined from the values of the Status attribute 743, 750 and the StatusDetails attribute 744, 751 designated in a case of receiving a registration/status update instruction. Also, there is a case where the resource management program 507 updates a value according to the status of the resource. Specifically, in a case where the value of the Status 903 in the resource management table 900 is "Available", the CPU 211 enables the designated resource. In a case where the value of the Status 903 is "Unavailable", the CPU 211 disables the designated resource.

Incidentally, in a case of newly registering a color profile, its Status 903 and StatusDetails 904 in the resource management table 900 are created as "Unavailable" and "Unvalidated", respectively. Thus, the newly registered color profile, which has not been subjected to color verification, cannot be used. The management-target image forming apparatus sends data for color verification to the management system 100, and the management system 100 performs the color verification. In a case where the management system 100 determines that the result of the color verification is acceptable, the management system 100 sends an update instruction 710 to update the Status 903 to "Available" to the management-target image forming apparatus. The CPU 211 of the image forming apparatus having received this update instruction updates the Status 903 in the resource management table 900 to “Available”, so that the newly registered color profile becomes available.

DateAdded 905 is the date and time of registration of the data in the resource management table 900. When writing the resource in S1115, the CPU 211 stores the current date and time obtained from the operating system in the storage unit 219.

Default 906 is information identifying whether the resource has been registered since the time of shipment. “TRUE” is stored as a value for data registered since the time of shipment. The CPU 211 stores “FALSE” in the storage unit 219 in S1115 for data created in response to a color profile creation instruction.

Name 907 is the name of the color profile. The Name 907 is such a name as to make the color profile easily recognizable, and differs from the file name of the resource. In S1118, the Name 907 is designated along with the value of the ID 901, and the CPU 211 stores the data under the designated ID 901 in the storage unit 219.

Type 908 is the type of the color profile. In S1118, the Type 908 is designated along with the value of the ID 901, and the CPU 211 stores the data under the designated ID 901 in the storage unit 219.

ColorSpace 909 represents the color space used by the color profile. In S1118, the ColorSpace 909 is designated along with the value of the ID 901, and the CPU 211 stores the data under the designated ID 901 in the storage unit 219. No value may be set for data for which the color space is automatically determined.

ElapsedTime 920 represents the time elapsed since the last update of the status of the color profile. The elapsed time starts being measured when the value of the Status 903 is updated to “Available”, and is reset to zero when the status is updated. The status update is an operation of updating the status from “Available” to “Unavailable” or indicating that the status remains as “Available”. In a case where the status remains “Available” even after being updated, the elapsed time is reset and then starts being counted again. Incidentally, this item is not used in the present embodiment.

Pieces of resource data 910, 911, 912 correspond to the color profiles 609, 610, 612 in the color profile management screen 600 in FIG. 6, respectively. The color profile 611 has been deleted as a result of executing the command element 731 representing a deletion instruction by following the processing illustrated in FIG. 10. Also, a piece of resource data 913 has been created by executing the ColorProfile element 740 in the Command element 738 including a registration instruction in the processes up to S1115 illustrated in FIGS. 11A and 11B. No value is set in the Name 907, the Type 908, and the ColorSpace 909 in the piece of resource data 913 since information on the color profile has not been written in S1118. The Status 903 is “Unavailable” and the StatusDetails 904 is “Incomplete” since the color profile is not available in this state.

<Flow of Processing in Case of Processing Color Profile Deletion Instruction>

Figure 10:
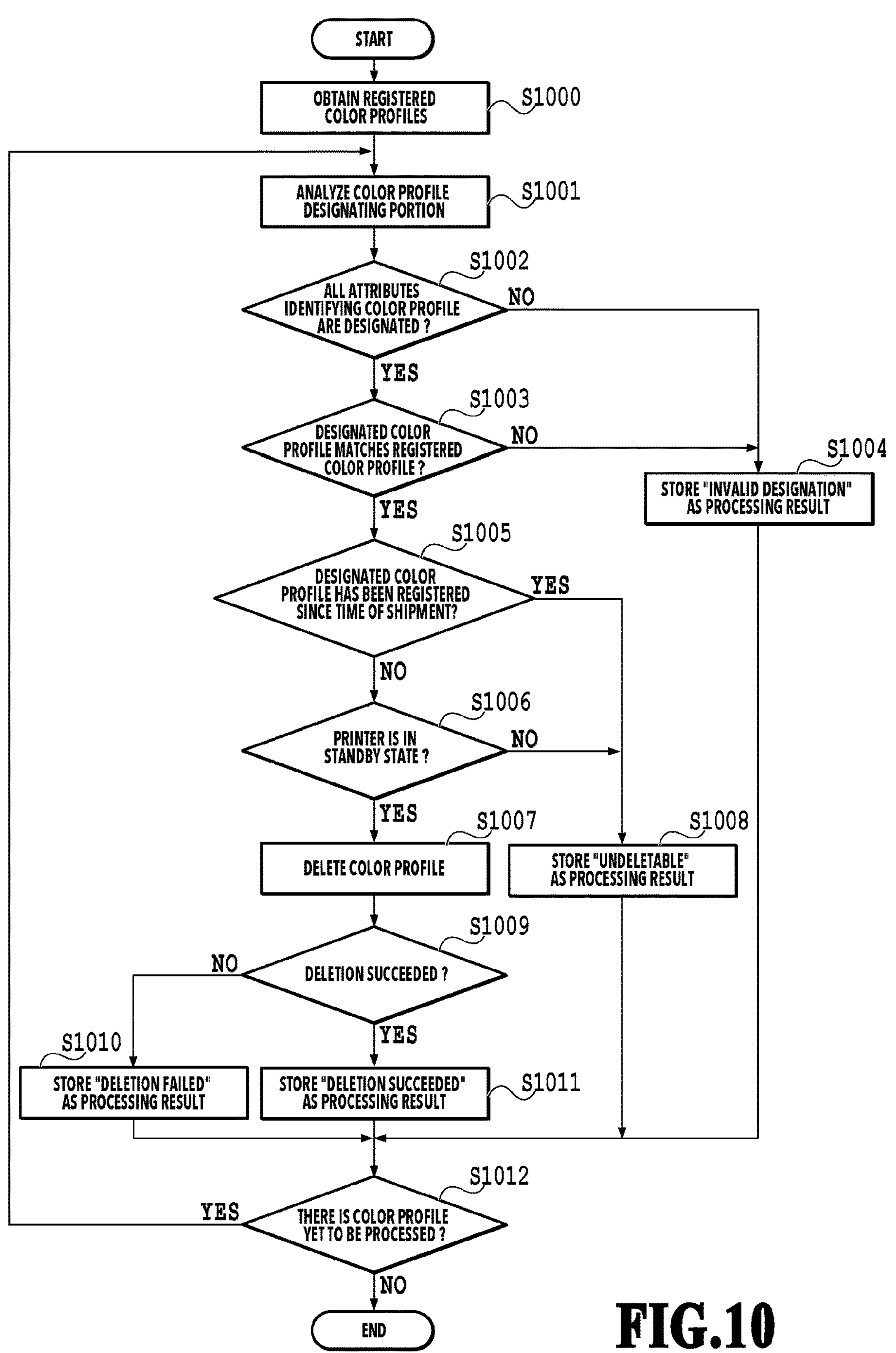
FIG. 10 is a flowchart illustrating processing in a case of executing a color profile deletion instruction.

FIG. 10 illustrates a flowchart explaining a flow of processing by the CPU 211 in the color profile deletion processing in S805.

In S1000, the CPU 211 obtains information on registered color profiles from the resource management program 507. The process performed by the CPU 211 is the same process as S802. After the CPU 211 obtains the information on the registered color profiles, the processing proceeds to S1001.

The processes of S1001 to S1012 are performed using information on a color profile including a deletion instruction (operation color profile information). In the information on the color profile including a deletion instruction, every ColorProfile element 735 at a lower portion of the Command element 731 in the deletion instruction is executed. In a case where plural color profiles are designated for which a deletion instruction has been issued, the ColorProfile element described first in the XML will be executed first. After executing the deletion processing from S1001 to S1012, the processing returns to S1001, and the CPU 211 executes the processing of the next ColorProfile element.

In S1001, the CPU 211 analyzes the ColorProfile element 735, which is a color profile designating portion. As described with reference to FIGS. 7A to 7C, information identifying the color profile and the like are described in the ColorProfile element 735. After the CPU 211 completes the analysis, the processing proceeds to S1002.

In S1002, the CPU 211 determines whether all pieces of information identifying the color profile are designated in the ColorProfile element 735.

The pieces of information identifying the color profile are the ProfileName attribute 736 and the ResourceUsage attribute 737 and also include the ColorSpace attribute 748 depending on the type of the color profile. In a case where even one piece of information is not designated or a color space or color profile type that does not exit is designated, the CPU 211 determines that not all pieces of information identifying the color profile are designated. In a case where the CPU 211 determines that all pieces of information identifying the color profile are designated, the processing proceeds to S1003. In a case where the CPU 211 determines that not all pieces of information identifying the color profile are designated, the processing proceeds to S1004.

In S1003, the CPU 211 determines whether there is a color profile among the registered color profiles obtained in S1000 that completely matches the pieces of information identifying the designated color profile. The CPU 211 makes the determination by comparing the values of the Name 907, the Type 908, and the ColorSpace 909 in the resource management table 900 obtained in S1000 with the corresponding values designated in the ColorProfile element 735. Incidentally, in a case where a color space is designated for a type of color profile whose color space does not need to be specified, that value is ignored and is not used in the comparison. In a case where the CPU 211 determines that there is a color profile among the obtained registered color profiles that completely matches the pieces of information identifying the designated color profile, the processing proceeds to S1005. In a case where the CPU 211 determines that there is no color profile among the obtained registered color profiles that completely matches the pieces of information identifying the designated color profile, the processing proceeds to S1004.

In S1004, the CPU 211 stores “invalid designation” as the result of the color profile deletion processing. After the CPU 211 stores the processing result, the processing proceeds to S1012.

In S1005, the CPU 211 determines whether the matched registered color profile is a color profile that has been registered since the time of shipment. The CPU 211 makes the determination by referring to the value of the Default 906 in the resource management table 900 obtained in S1000. The CPU 211 cannot delete a color profile that has been registered since the time of shipment. In a case where the CPU 211 determines that the matched registered color profile is a color profile that has been registered since the time of shipment, the processing proceeds to S1008. In a case where the CPU 211 determines that the matched registered color profile is not a color profile that has been registered since the time of shipment, the processing proceeds to S1006.

In S1006, the CPU 211 obtains the print execution status from the print control program 504, and determines whether the image forming apparatus is in a standby state, in which the image forming apparatus does not execute printing. The CPU 211 is allowed to delete a color profile in a case where the image forming apparatus is in the standby state, since deleting a color profile while it is in use for printing may cause defective printing. Alternatively, the CPU 211 may obtain the color profile used in a job currently executing printing, and determine whether that color profile matches the color profile to be deleted. In a case where the CPU 211 determines that the image forming apparatus is in the standby state, the processing proceeds to S1007. In a case where the CPU 211 determines that the image forming apparatus is not in the standby state, the processing proceeds to S1008.

In S1007, the CPU 211 instructs the resource management program 507 to delete the color profile. The CPU 211 designates the identifier of the color profile determined to be a matched color profile in S1003, and issues an instruction to delete it. The resource management program 507 having received the instruction obtains data with the matched identifier from the resource management table 900, deletes the file in the storage unit 219, and deletes the profile data in the resource management table 900. After completing the deletion, the CPU 211 obtains the result of the deletion, and the processing proceeds to S1009.

In S1008, the CPU 211 stores "undeletable" as the result of the color profile deletion processing. After the CPU 211 stores the processing result, the processing proceeds to S1012.

In S1009, the CPU 211 determines whether the deletion succeeded. The CPU 211 makes the determination based on returned values obtained from the resource management program 507. In a case where the CPU 211 determines that the deletion succeeded, the processing proceeds to S1011. In a case where the CPU 211 determines that the deletion failed, the processing proceeds to S1010.

In S1010, the CPU 211 stores "deletion failed" as the result of the color profile deletion processing. After the CPU 211 stores the processing result, the processing proceeds to S1012.

In S1011, the CPU 211 stores "deletion succeeded" as the result of the color profile deletion processing. After the CPU 211 stores the processing result, the processing proceeds to S1012.

In S1012, the CPU 211 determines whether there is a color profile yet to be processed. The CPU 211 determines whether there is a color profile yet to be processed by determining whether there is another ColorProfile element after the ColorProfile element processed up to the previous step. In a case where the CPU 211 determines that there is another ColorProfile element, the processing proceeds to S1001. In a case where determining that there is not another ColorProfile element, the CPU 211 finishes the color profile deletion processing.

<Flow of Processing in Case of Processing Color Profile Registration/Update Instruction>

Figure 11A:
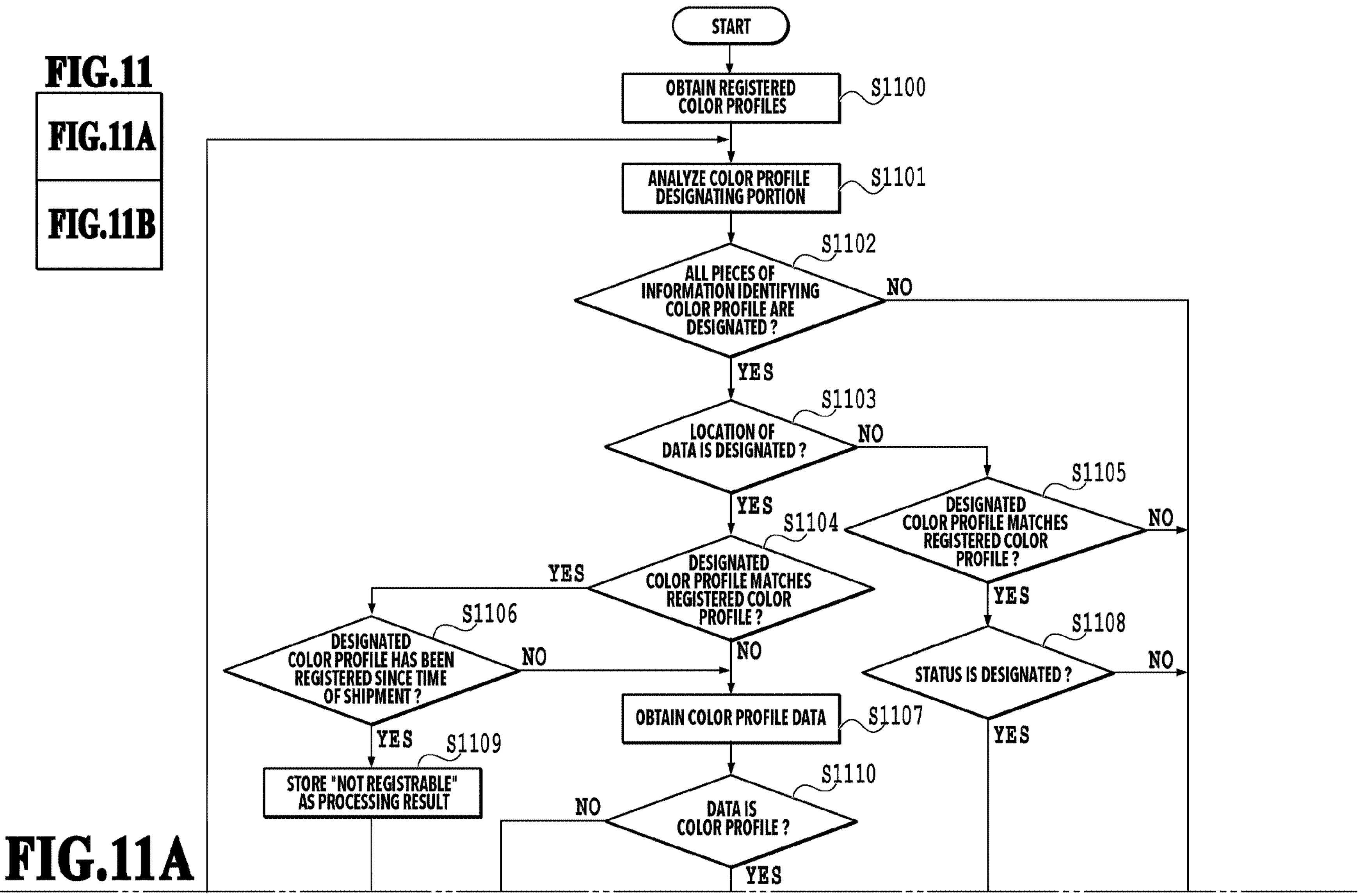
FIG. 11 is a diagram showing the relationship of FIGS. 11A and 11B, and FIGS. 11A and 11B are flowcharts illustrating processing in a case of executing a color profile registration-update instruction.
Figure 11B:
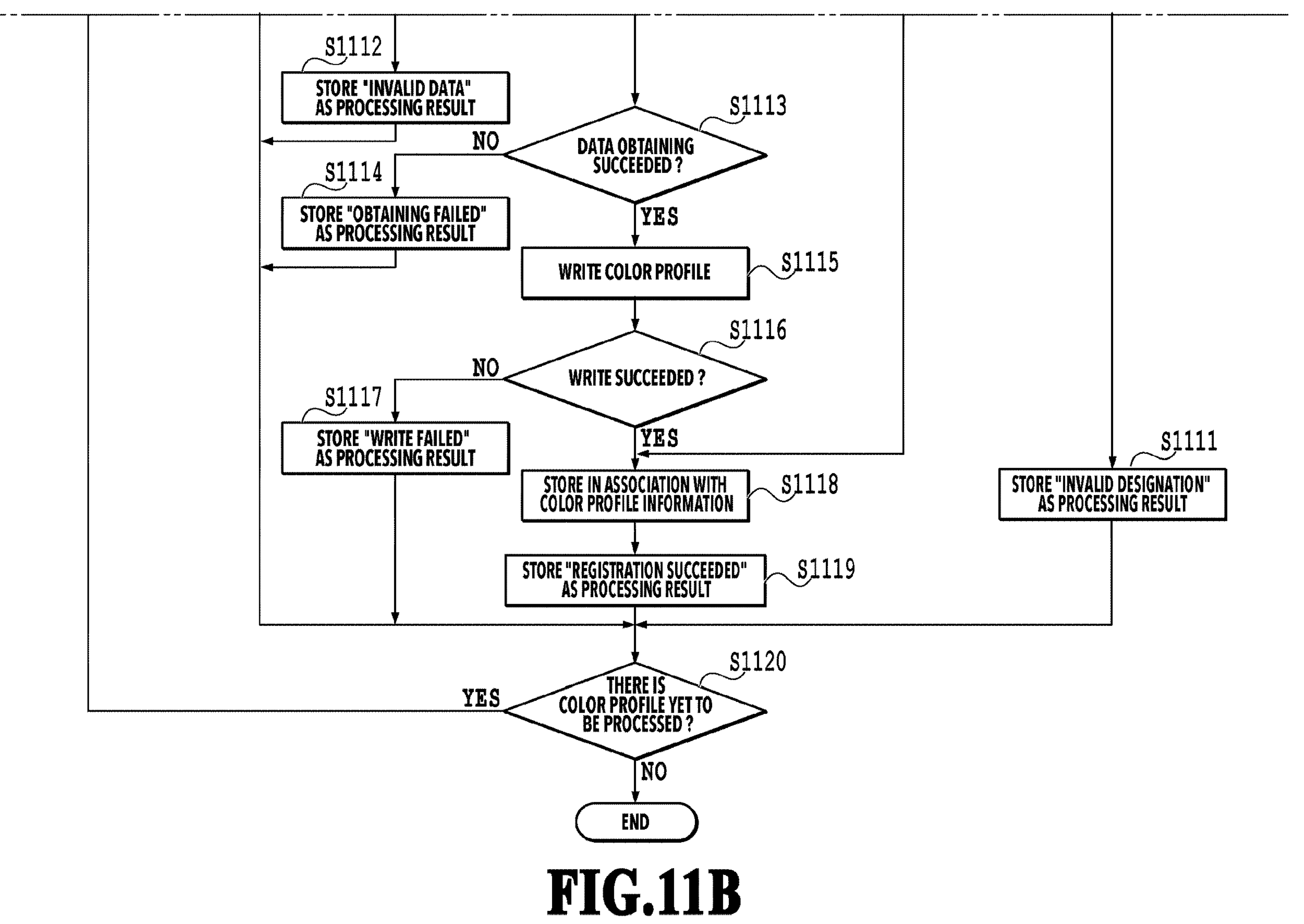

FIGS. 11A and 11B illustrate a flowchart explaining a flow of processing by the CPU 211 in the color profile registration/update processing in S807.

An outline of the processing in FIGS. 11A and 11B is as follows. In a case where all pieces of information identifying a color profile are designated and the address of the data of the color profile is designated, the image forming apparatus performs registration processing. Here, in a case where all pieces of the color profile identifying information match those of a color profile stored in the resource management table 900, the image forming apparatus also handles the processing of the color profile as the registration processing (replacement processing). In a case where all pieces of color profile identifying information are designated but the address of the data of the color profile is not designated, the image forming apparatus performs update processing (update registration processing). Details of the processing in FIGS. 11A and 11B will be described below.

In S1100, the CPU 211 obtains information on registered color profiles from the resource management program 507. This is the same process as S802. After the CPU 211 obtains the information on the registered color profiles, the processing proceeds to S1101.

The processes of S1101 to S1120 are performed using information on a color profile including a registration/update instruction (operation color profile information). In the information on the color profile including a registration/update instruction, for every ColorProfile element 740, 746 at a lower portion of the Command element 738 in the registration/update instruction, the CPU 211 executes a registration/update instruction. In a case where plural color profiles are designated for which a registration/update instruction has been issued, a registration/update instruction will be executed first on the ColorProfile element described first in the XML, and the processing proceeds from S1120 to S1101. The CPU 211 then processes the next ColorProfile element.

In S1101, the CPU 211 analyzes the ColorProfile element 740, 746, which is a color profile designating portion. As described with reference to FIG. 7C, information identifying the color profile, the address of the data of the color profile, and the status of the color profile are described in the ColorProfile element 740, 746. After the CPU 211 completes the analysis, the processing proceeds to S1102.

In S1102, the CPU 211 determines whether all pieces of information identifying the color profile are designated in the ColorProfile element 740, 746. The pieces of information identifying the color profile are the ProfileName attribute 741, 747 and the ResourceUsage attribute 742, 749 and also include the ColorSpace attribute 748 depending on the type of the color profile. In a case where even one piece of information is not designated or a color space or color profile type that does not exit is designated, the CPU 211 determines that not all pieces of information identifying the color profile are designated. In a case where the CPU 211 determines that all pieces of information identifying the color profile are designated, the processing proceeds to S1103. In a case where the CPU 211 determines that not all pieces of information identifying the color profile are designated, the processing proceeds to S1111.

In S1103, the CPU 211 determines whether the address of the color profile data, i.e., the URL attribute 745, is designated in the ColorProfile element 740. As described earlier, if the CPU 211 determines that the URL attribute 745 is designated, the CPU 211 registers or replaces the color profile. In a case where the CPU 211 determines that the URL attribute 745 is not designated, the CPU 211 updates the status. In a case where the CPU 211 determines that the address of the data is designated, the processing proceeds to S1104. In a case where the CPU 211 determines that the address of the data is not designated, the processing proceeds to S1105.

In S1104, the CPU 211 determines whether there is a color profile among the registered color profiles obtained in S1100 that completely matches the pieces of information identifying the designated color profile. The CPU 211 makes the determination by comparing the values of the Name 907, the Type 908, and the ColorSpace 909 in the resource management table 900 obtained in S1100 with the corresponding values designated in the ColorProfile element 740. Incidentally, in a case where a color space is designated for a type of color profile whose color space does not need to be specified, that value is ignored and is not used in the comparison. In a case where the CPU 211 determines that there is a color profile among the obtained registered color profiles that completely matches the pieces of information identifying the designated color profile, the processing proceeds to S1106. In a case where the CPU 211 determines that there is no color profile among the obtained registered color profiles that completely matches the pieces of information identifying the designated color profile, the processing proceeds to S1107.

In S1105, the CPU 211 determines whether there is a color profile among the registered color profiles obtained in S1100 that completely matches the pieces of information identifying the designated color profile. This process is the same as S1104. In a case where the CPU 211 determines that there is a color profile among the obtained registered color profiles that completely matches the pieces of information identifying the designated color profile, the processing proceeds to S1108. In a case where the CPU 211 determines that there is no color profile among the obtained registered color profiles that completely matches the pieces of information identifying the designated color profile, the processing proceeds to S1111.

In S1106, the CPU 211 determines whether the registered color profile with the matched identifying information is a color profile that has been registered since the time of shipment. The CPU 211 makes the determination by referring to the value of the Default 906 in the resource management table 900 obtained in S1100. The CPU 211 cannot overwrite a color profile that has been registered since the time of shipment. In a case where the CPU 211 determines that the matched registered color profile is a color profile that has been registered since the time of shipment, the processing proceeds to S1109. In a case where the CPU 211 determines that the matched registered color profile is not a color profile that has been registered since the time of shipment, the processing proceeds to S1107.

In S1107, the CPU 211 attempts to obtain the color profile data from the address designated in the URL attribute 745. The obtaining method is determined by the protocol used. For example, in a case where the URL attribute 745 is designated with http, the color profile data is obtained from a http server by using http communication. In a case where the URL attribute 745 is designated with cid, data with a matched Content-ID is obtained out of a multipurpose internet mail extensions (MIME) file. After the CPU 211 obtains the color profile data, the processing proceeds to S1110.

In S1108, the CPU 211 determines whether the status of the color profile is designated in the ColorProfile element 740, 746, that is, the Status attribute 743, 750 and the StatusDetails attribute 744, 751 are designated. In a case where the CPU 211 determines that the Status attribute and the StatusDetails attribute are designated, the processing proceeds to S1118. In a case where the CPU 211 determines that neither the Status attribute nor the StatusDetails attribute is designated, the processing proceeds to S1111.

In S1109, the CPU 211 stores "not registrable" as the result of the color profile registration/update processing. After the CPU 211 stores the processing result, the processing proceeds to S1120.

In S1110, the CPU 211 determines whether the data designated by the URL attribute is a color profile. The determination is made based on whether the file extension is ice or icm or whether a http header returned by a http server or the Content-Type of the header of the MIME part of MIME is application/vnd.iccprofile. In a case where the CPU 211 determines that the obtained value of the color profile is different from the above value, the CPU 211 determines that data other than a color profile has been designated, and does not perform the write processing. In a case where the CPU 211 determines that the obtained data is a color profile, the processing proceeds to S1113. In a case where the CPU 211 determines that the obtained data is not a color profile, the processing proceeds to S1112.

In S1111, the CPU 211 stores "invalid designation" as the result of the color profile registration/update processing. After the CPU 211 stores the processing result, the processing proceeds to S1120.

In S1112, the CPU 211 stores "invalid data designated" as the result of the color profile registration/update processing. After the CPU 211 stores the processing result, the processing proceeds to S1120.

In S1113, the CPU 211 determines whether the obtaining of the data of the color profile succeeded. In a case where the CPU 211 could not access the file, the data did not exist, the communication was disconnected while the data was obtained, or in a similar case, the CPU 211 determines that the obtaining of the data of the color profile failed. In a case where the CPU 211 determines that the obtaining of the data succeeded, the processing proceeds to S1115. In a case where the CPU 211 determines that the obtaining of the data failed, the processing proceeds to S1114.

In S1114, the CPU 211 stores "data obtaining failed" as the result of the color profile registration/update processing. For each reason of failure to obtain the data, the CPU 211 may store a detailed result. For example, causes may be categorized by connection timeout, designation of an invalid URL, and so on, and the CPU 211 may store "data obtaining failed due to a timeout" and "data obtaining failed due to designation of an invalid URL". After the CPU 211 stores the processing result, the processing proceeds to S1120.

In S1115, the CPU 211 writes the color profile data. The write operation is performed in response to an instruction from the resource management program 507, and the color profile data is written to a predetermined folder in the storage unit 219. After the CPU 211 completes the write operation, the resource management program 507 allocates an identifier for identifying the color profile. The resource management program 507 registers the identifier, the address of the file, and the current date and time obtained from the operating system as the registration date and time in the resource management table 900, and returns the identifier as the result. After the CPU 211 completes the write operation and the registration, the processing proceeds to S1116.

In S1116, the CPU 211 determines whether the write of the color profile succeeded. Causes of a write operation failure include corruption of the data, lack of space in the storage area given for the resource management program 507, and so on. The CPU 211 can determine whether the write operation succeeded or failed based on whether a valid identifier has been returned. In a case where the CPU 211 determines that the write operation succeeded, the processing proceeds to S1118. In a case where the CPU 211 determines that the write operation failed, the processing proceeds to S1117.

In S1117, the CPU 211 stores "data write failed" as the result of the color profile registration/update processing. After the CPU 211 stores the processing result in the storage unit 219, the processing proceeds to S1120.

In S1118, the CPU 211 instructs the resource management program 507 to store information on the color profile in the resource management table 900. In a case where the identifier of a color profile registered in the resource management table 900 is designated, the CPU 211 can add or update the information on that color profile. In a case where a color profile is newly registered, its name, type, color space, and status can be registered. In a case of replacing a color profile or updating the status of a color profile, the status can be updated. After the CPU 211 completes storing the color profile information, the processing proceeds to S1119.

In S1119, the CPU 211 stores "registration succeeded" as the result of the color profile registration/update processing. After the CPU 211 stores the processing result in the storage unit 219, the processing proceeds to S1120.

In S1120, the CPU 211 determines whether there is a color profile yet to be processed. Whether there is a color profile yet to be processed is determined by determining whether there is another ColorProfile element after the ColorProfile element processed up to the previous step. In a case where the CPU 211 determines that there is another ColorProfile element, the processing proceeds to S1101. In a case where determining that there is not another ColorProfile element, the CPU 211 finishes the color profile registration/update processing.

<Schematic Diagrams of Screens to be Displayed on Display Unit of Image Forming Apparatus>

Figure 12A:
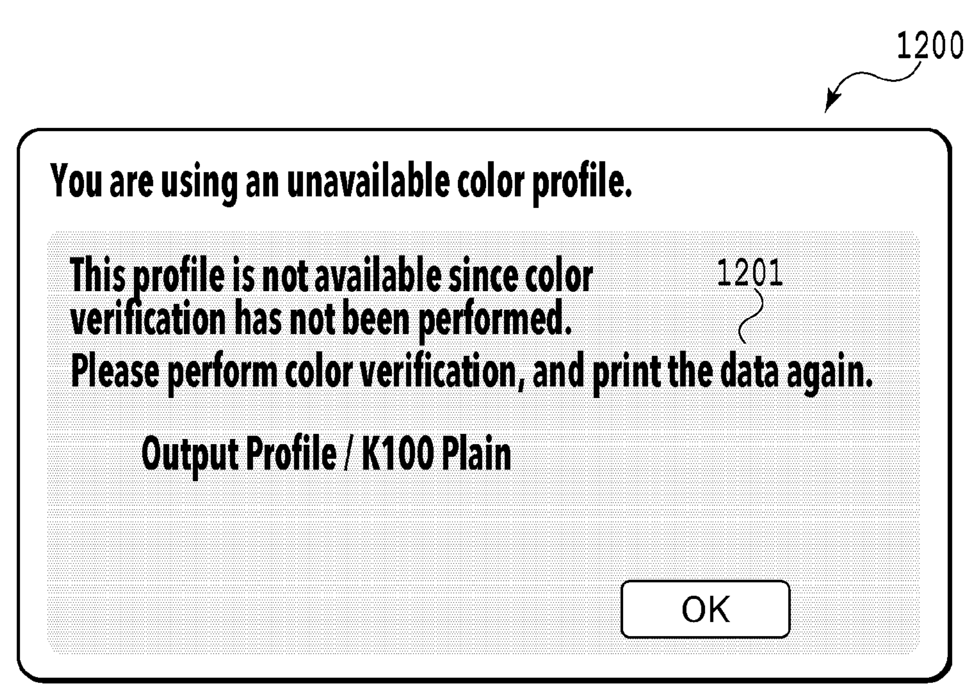
FIG. 12A is a schematic diagram of a screen to be displayed on a display unit of the image forming apparatus.

FIG. 12A illustrates a screen displayed on the UI panel 213 of the image forming apparatus 102, 104 in a case where a print job using the color profile 610 is input into the image forming apparatus 102, 104 or the color profile 610 is selected on the UI panel 213.

Figure 12B:
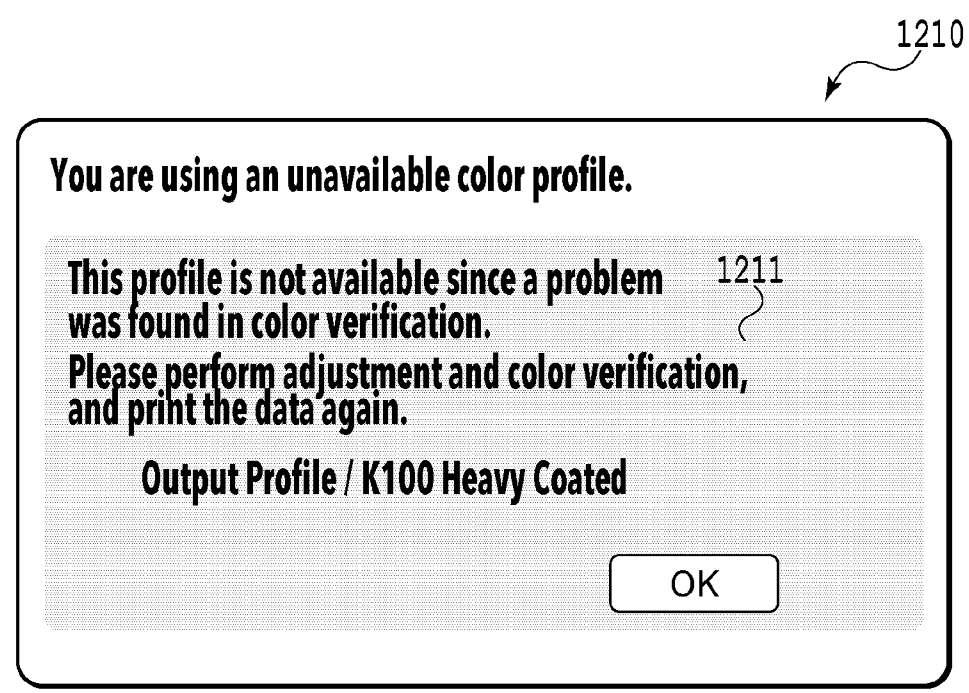
FIG. 12B is a schematic diagram of a screen to be displayed on the display unit of the image forming apparatus.

FIG. 12B illustrates a screen displayed on the UI panel 213 of the image forming apparatus 102, 104 in a case where a print job using the color profile 611 is input into the image forming apparatus 102, 104 or the color profile 611 is selected on the UI panel 213.

The CPU 211 obtains information on a designated color profile from the resource management table 900, and displays a message determined from the value of the StatusDetails 1104 in a case where the Status 903 is not "Available".

An unperformed color verification warning screen 1200 is a schematic diagram of a screen displayed on the UI panel 213 in a case of attempting to use or select a color profile whose value of the StatusDetails 904 is "Unvalidated". As an unperformed color verification warning message 1201, the reason why the color profile is not available, a method to solve the problem, and information identifying the profile causing the situation are displayed. "Unvalidated" is a value indicating that color verification has not been performed for a predetermined time period or longer. Thus, an instruction to perform color verification is displayed as the unperformed color verification warning message 1201. After color verification is performed, the management system 100 issues an instruction to update the status of the color profile so that the Status will be updated to "Available". In this way, the color profile will become available. In a case where the Status is updated to "Available", performing the same job or the same selection operation will not display the unperformed color verification warning screen 1200.

An color verification failure warning screen 1210 is a schematic diagram of a screen displayed on the UI panel 213 in a case of attempting to use or select a color profile whose value of the StatusDetails 904 is "ValidationFailed". "ValidationFailed" is a value indicating that the color reproducibility was found insufficient in color verification. Thus, an instruction prompting the operator to perform adjustment and color verification is displayed as a color verification failure warning message 1211. As with the unperformed color verification warning screen 1200, in a case where the color reproducibility is confirmed to be sufficient by color verification, and an instruction to update the status of the color profile is issued to update the Status to "Available", the color verification failure warning screen 1210 stops being displayed.

As described above, each image forming apparatus according to the present embodiment can easily accept obtaining, deletion, registration, and update of information on color profiles from the outside and easily manage color profiles by using JMFs described in a common message format. Also, in a case where the color reproducibility was found problematic in color verification or color verification has not been performed for a predetermined time period or longer, the image forming apparatus can receive an instruction to update the status of the color profile and render the color profile unavailable. The management system according to the present embodiment can manage color profiles by a common method and reflect the result of each individual color profile's color verification, even in a case where the management system is a system that performs color verification collectively on plural devices, like a remote management system.

Second Embodiment

In the first embodiment, a configuration has been described in which the image forming apparatuses 102, 104 are connected to the network 105 and receive the instructions, query, and so on related to color profiles illustrated in FIGS. 7A to 7C from the management system 100.

Figure 13:
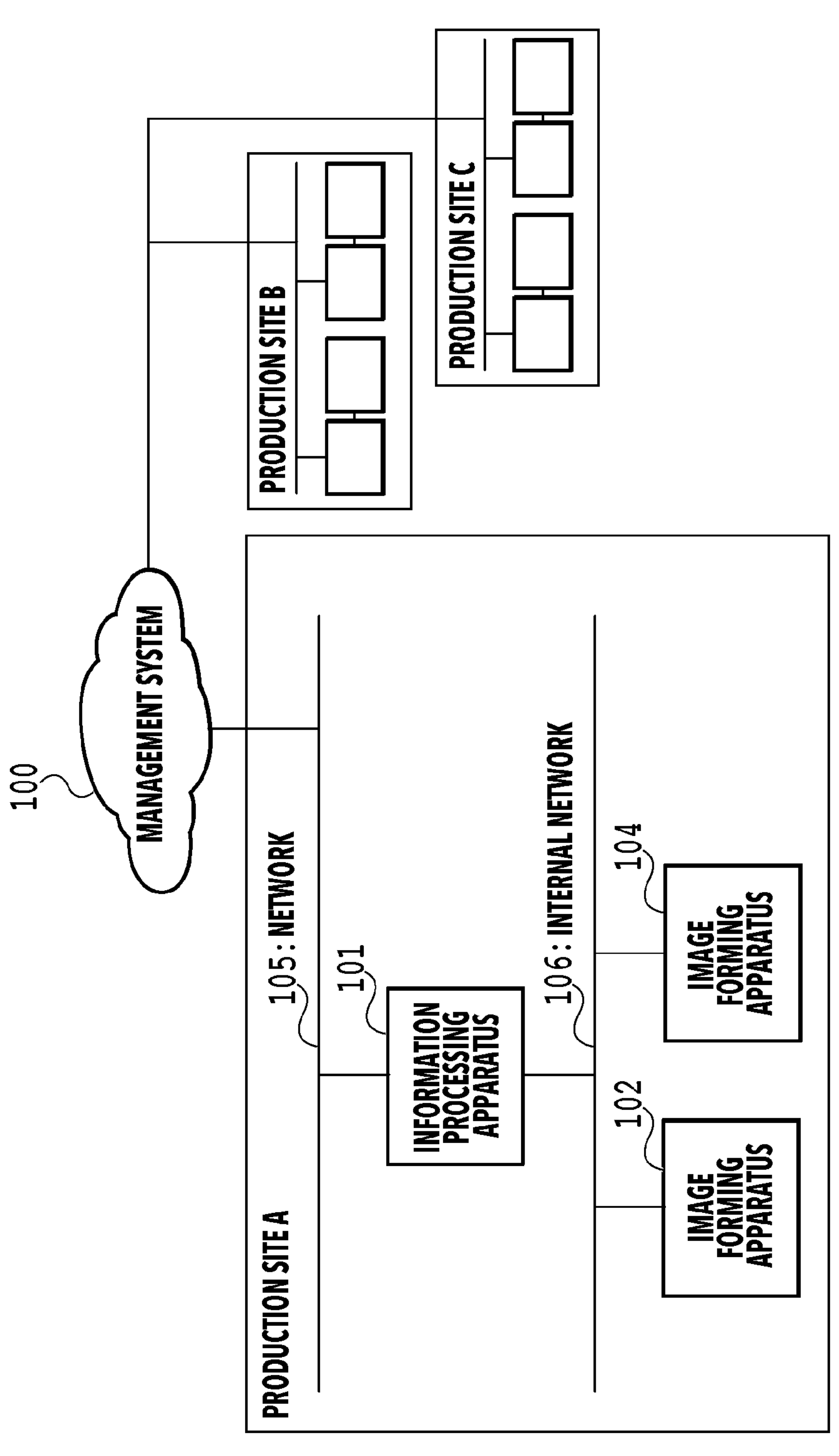
FIG. 13 is a diagram illustrating an example of the system configuration of a system according to the present disclosure.

From the viewpoint of security, printing companies sometimes employ a configuration in which the image forming apparatuses 102, 104 are not directly connected to the external network 105. For example, it is possible to employ a configuration in which, as illustrated in FIG. 13, the information processing apparatus 101 is connected to the external network 105, and the information processing apparatus 101 and the image forming apparatuses 102, 104 are connected by an internal network 106.

In a second embodiment, a description will be given of a method of enabling acceptance of obtaining, deletion, registration, and update of information on color profiles and so on in a case where the image forming apparatuses 102, 104 cannot directly receive instructions from the management system 100.

In the following description, an example in which plural image forming apparatuses are present is described. A system configuration with the management system 100, the information processing apparatus 101, and the image forming apparatus 102 can also implement the functions to be implemented in the following description.

<Software Configuration of Information Processing Apparatus 101>

Figure 14:
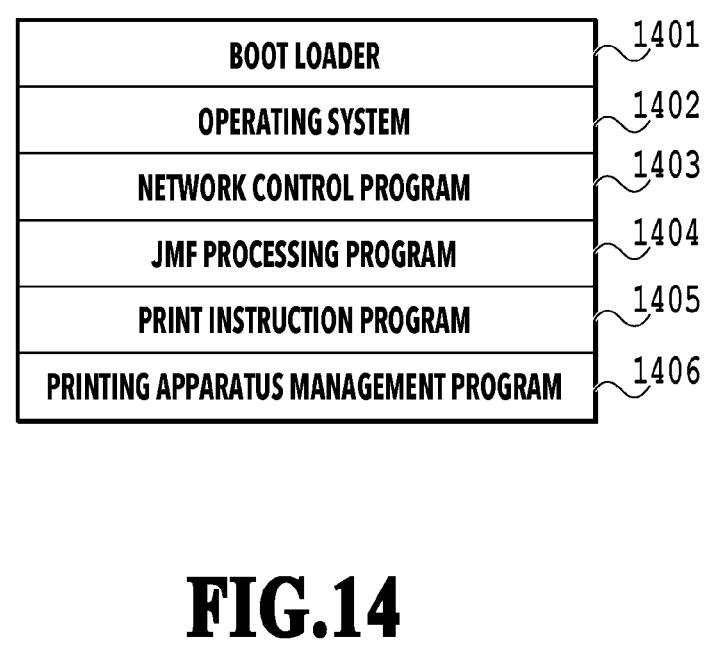

FIG. 14 is a diagram of a software configuration of the information processing apparatus 101 in the second embodiment.

A boot loader 1401, an operating system 1402, a network control program 1403, and a print instruction program 1405 are the same as the boot loader 401, the operating system 402, the network control program 403, and the print instruction program 408 in FIG. 4B, respectively.

While the JMF processing program 1404 is a program that performs the same processing as that by the JMF processing program 406, the JMF processing program in the present embodiment also performs the processing performed by the JMF processing program 506 of each image forming apparatus in the first embodiment. Specifically, the JMF processing program 1404 performs the analysis of the JMFs in FIGS. 7A to 7C and the creation of a response message.

A printing apparatus management program 1406 is a program for managing the image forming apparatuses 102, 104 connected through the internal network 106. All instructions from the management system 100 addressed to the image forming apparatuses 102, 104 are sent to the information processing apparatus 101. The information processing apparatus 101 analyzes each instruction to identify the instruction-target image forming apparatus, and causes the image forming apparatus to execute the contents of the instruction. Also, the printing apparatus management program 1406 has a printing apparatus management screen (not illustrated) in which the managed image forming apparatuses and how instructions are executed are registered.

<Printing Apparatus Management Table>

FIG. 15 is a printing apparatus management table 1500 included in the printing apparatus management program 1406 which indicates the correspondence between the image forming apparatuses 102, 104 and how the image forming apparatuses are caused to execute instructions. Data is added in a case where the operator registers an image forming apparatus on the printing apparatus management screen. Only instructions relevant to the present disclosure are listed in the printing apparatus management table 1500.

A device ID 1501 is a unique ID identifying an image forming apparatus. The device ID 1501 is used to identify to which image forming apparatus an instruction from the management system 100 is addressed. Thus, the value stored in the device ID 1501 must be a value which the whole system can commonly recognize. Instruction targets are designated in the DeviceID elements 705 in various JMFs created by the management system 100. By comparing the value of the DeviceID element 705 which the JMF processing program 1404 obtained by analyzing a JMF and the value of the device ID 1501 of each piece of data, it is possible to determine to which image forming apparatus the instruction is addressed.

An IP address 1502 is the IP address of the image forming apparatus. Since each image forming apparatus in the present embodiment is connected to the internal network 106, the stored IP address is a local address.

Color profile obtaining operation registration 1503 indicates which the type of operation obtains the color profile in a case of receiving the color profile obtaining instruction from the management system 100. The color profile obtaining operation registration 1503 includes data of an operation 1504 and a port 1505. The operation 1504 stores the operation to be performed to obtain a color profile. The stored value contains the name of an Http Get method or an application programming interface (API), the name of a program, or the like. The port 1505 stores a port number for performing the operation indicated in the operation 1504.

Color profile registration operation registration 1506 and color profile deletion operation registration 1509 indicate methods of operation in a case of receiving an instruction to perform a color profile registration operation and an instruction to perform a color profile deletion operation from the management system 100, respectively.

Pieces of registered device data 1512, 1513, 1514, 1515 are each data of a registered image forming apparatus. The piece of registered device data 1512 indicates that information of color profiles can be obtained, deleted, registered, and updated by JMFs. The piece of registered device data 1513 indicates that query can be made by the Http Get method with a port 31001 and registration can be performed by the Http Post method with the port 31001 whereas there is no means for deletion. The piece of registered device data 1514 indicates that query can be made by the Http Get method whereas there is no means for registration and deletion. The piece of registered device data 1513 indicates that query, registration, and deletion can each be performed by executing a corresponding script.

<Flow of Processing in Case of Receiving Data on Color Profile Management>

Figure 16B:
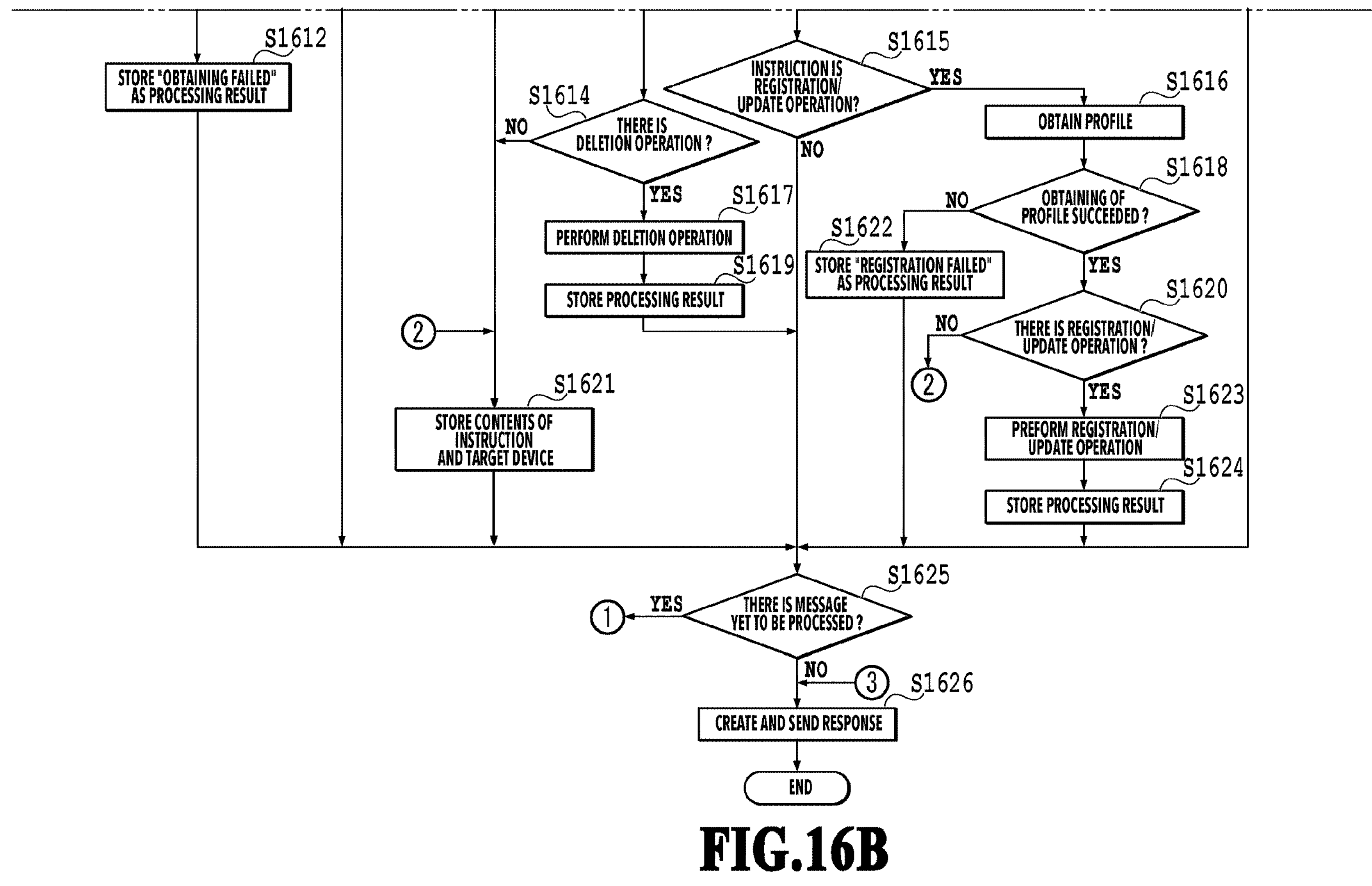
FIG. 16 is a diagram showing the relationship of FIGS. 16A and 16B, and FIGS. 16A and 16B are flowcharts illustrating processing in a case of receiving color profile management data.

FIGS. 16A and 16B are flowcharts explaining a flow of processing by the CPU 301 of the information processing apparatus 101 in a case of receiving the color profile query and operation instructions described with reference to FIGS. 7A to 7C. Unlike the first embodiment, the information processing apparatus 101 analyses the JFM. In the following, description of the same processes as those in FIG. 8 is omitted.

The CPU 301 performs the series of processes illustrated in the flowcharts of FIGS. 16A and 16B by executing a program stored in the ROM 303 and loaded to the RAM 302. Alternatively, the functions of some or all of the steps in FIGS. 16A and 16B may be implemented with hardware such as an ASIC, an FPGA, or an electronic circuit. Meanwhile, the symbol "S" in the description of each process means a step in the flowchart.

In S1600, the CPU 301 analyzes a received JMF. This process is the same as S800. After the CPU 301 completes the analysis, the processing proceeds to S1601.

In S1601, the CPU 301 determines whether an instruction-target device is designated. The instruction-target device is a value designated by the DeviceID element 705, and is a value that can identify the image forming apparatus which will execute an instruction to perform query, deletion, registration, update, or the like of a color profile received via the JMF message. In a case where the CPU 301 determines that the DeviceID element 705 is designated, the processing proceeds to S1602. In a case where the CPU 301 determines that the DeviceID element 705 is not designated, the processing proceeds to S1604.

In S1602, the CPU 301 determines whether the instruction-target device is valid. The CPU 301 determines whether there is data registered in the printing apparatus management table 1500 whose value of the device ID 1501 matches the value designated in the DeviceID element 705. In a case where the CPU 301 determines that there is no data registered in the printing apparatus management table 1500 whose value of the device ID 1501 matches the value designated in the DeviceID element 705, the CPU 301 determines that the designated image forming apparatus is not an image forming apparatus managed by the information processing apparatus 101. Thus, the CPU 301 determines that the designation by this JMF message is invalid. In a case where the CPU 301 determines that the instruction-target device is valid, the processing proceeds to S1603. In a case where the CPU 301 determines that the instruction-target device is not valid, the processing proceeds to S1604.

In S1603, the CPU 301 determines whether the message in the JMF is a color profile query. This process is the same as S801. In a case where the CPU 301 determines that the message is a query, the processing proceeds to S1605. In a case where the CPU 301 determines that the message is not a query, the processing proceeds to S1606.

In S1604, the CPU 301 stores "invalid device designation" as the processing result of the message. After the CPU 301 stores the processing result, the processing proceeds to S1625.

In S1605, the CPU 301 determines whether there is means for making a color profile query. The CPU 301 refers to the color profile obtaining operation registration 1503 of the data in the printing apparatus management table 1500 whose device ID 1501 matches the value of the DeviceID element 705, and determines whether an obtaining operation is registered. In a case where the CPU 301 determines that the obtaining operation is registered in the color profile obtaining operation registration 1503, the processing proceeds to S1607. In a case where the CPU 301 determines that the obtaining operation is not registered in the color profile obtaining operation registration 1503, the processing proceeds to S1621.

In S1606, the CPU 301 determines whether the message in the JMF is an operation instruction for a color profile. This process is the same as S803. In a case where the CPU 301 determines that the message is an operation instruction, the processing proceeds to S1608. In a case where the CPU 301 determines that the message is not an operation instruction, the processing proceeds to S1624.

In S1607, the CPU 301 executes the color profile obtaining operation designated in the color profile obtaining operation registration 1503. For example, in a case of JMF, the CPU 301 sends the query JMF as is to the image forming apparatus. In a case of API, the CPU 301 calls the API and obtains a value. In a case of http, the CPU 301 sends an http request by a designated method. After the CPU 301 obtains the color profile, the processing proceeds to S1610.

In S1608, the CPU 301 determines whether all pieces of information identifying the color profile are designated in the ColorProfile element 740, 746. This process is the same as S1102. In a case where the CPU 301 determines that all pieces of information identifying the color profile are designated, the processing proceeds to S1611. In a case where the CPU 301 determines that not all pieces of information identifying the color profile are designated, the processing proceeds to S1609.

In S1609, the CPU 301 stores "invalid designation" as the processing result of the message. After the CPU 301 stores the processing result, the processing proceeds to S1625.

In S1610, the CPU 301 determines whether the color profile was successfully obtained. The determination is made by determining the values of obtained by the query means implemented in S1607. The obtaining is considered successful if the obtained values include information on the color profile, and the obtaining is considered failure if the obtained values do not include information on the color profile. In a case where it is difficult to make the determination, the CPU 301 determines that the obtaining was successful, and a response including the obtained values will be created in S1625. In a case where the CPU 301 determines that the obtaining of information on the color profile was successful, the processing proceeds to S1613. In a case where the CPU 301 determines that the obtaining of information on the color profile was failure, the processing proceeds to S1613.

In S1611, the CPU 301 determines whether the received operation instruction is a deletion operation. This process is the same as S804. In a case where the CPU 301 determines that the received operation instruction is a deletion operation, the processing proceeds to S1614. In a case where the CPU 301 determines that the received operation instruction is a deletion operation, the processing proceeds to S1615.

In S1612, the CPU 301 stores "obtaining failed" as the processing result of the message. After the CPU 301 stores the processing result, the processing proceeds to S1625.

In S1613, the CPU 301 stores the obtained information on the color profiles. After the CPU 301 stores the processing result, the processing proceeds to S1625.

In S1614, the CPU 301 determines whether there is means for deleting the color profile. This processing is similar to S1605, and the CPU 301 refers to the color profile deletion operation registration 1509. In a case where the CPU 301 determines that a deletion operation has been registered, the processing proceeds to S1617. In a case where the CPU 301 determines that no deletion operation has been registered, the processing proceeds to S1621.

In S1615, the CPU 301 determines whether the operation instruction is a registration/update operation. This process is the same as S806. In a case where the CPU 301 determines that the received operation instruction is the registration/update operation, the processing proceeds to S1616. In a case where the CPU 301 determines that the received operation instruction is the registration/update operation, the processing proceeds to S1625.

In S1616, the CPU 301 attempts to obtain the color profile data from the address designated in the URL attribute 745. This process is the same as S1107. In a case where the CPU 301 determines that no address is designated in the URL attribute 745, an operation of obtaining the color profile will not be performed. After the CPU 301 completes obtaining the color profile, the processing proceeds to S1618.

In S1617, the CPU 301 executes the color profile deletion operation designated in the color profile deletion operation registration 1509. After the CPU 301 completes the color profile deletion operation, the processing proceeds to S1619.

In S1618, the CPU 301 determines whether the obtaining of the data of the color profile succeeded. This process is the same as S1113. In a case where the CPU 301 determines that the obtaining of the color profile succeeded, the processing proceeds to S1620. In a case where the CPU 301 determines that the obtaining of the color profile failed, the processing proceeds to S1613.

In S1619, the CPU 301 stores the result of the deletion operation. The result of the deletion is determined from the returned values of the deletion operation performed in S1617. In a case where there is no returned value or it is difficult to make a determination, the CPU 301 may determine that the deletion succeeded. Alternatively, the CPU 301 may implement the color profile query means implemented in S1607, and determine that the deletion succeeded in a case where the color profile is not present. After the CPU 301 stores the processing result, the processing proceeds to S1625.

In S1620, the CPU 301 determines whether there is means for registering or updating the color profile. This process is similar to S1605, and the CPU 301 refers to the color profile registration operation registration 1506. In a case where the CPU 301 determines that the received registration/update operation has been registered, the processing proceeds to S1623. In a case where the CPU 301 determines that the received registration/update operation has not been registered, the processing proceeds to S1621.

In S1621, the CPU 301 stores the contents of the received instruction and the image forming apparatus that is the sending destination of the instruction. The contents of the instruction and the sending-destination image forming apparatus thus stored are displayed on the display of the information processing apparatus 101 to prompt the user to manually execute the contents of the instruction. The CPU 301 stores "succeeded" as the processing result of the message. After the CPU 301 stores the contents of the instruction, the processing proceeds to S1625.

In S1622, the CPU 301 stores "registration failed" as the processing result of the message. After the CPU 301 stores the processing result, the processing proceeds to S1625.

In S1623, the CPU 301 executes the color profile registration/update operation designated in the color profile registration operation registration 1506. After the CPU 301 executes the color profile registration/update operation, the processing proceeds to S1624.

In S1624, the CPU 301 stores the result of the registration/update operation. In this process, the CPU 301 may determine the result from the returned values as in S1619. Alternatively, the CPU 301 may implement the color profile query means after the registration, and determine that the registration succeeded in a case where the color profile is present. After the CPU 301 stores the processing result, the processing proceeds to S1625.

The process in S1625 is the same as the process in S808. In a case where the CPU 301 determines that there is a message yet to be processed, the processing proceeds to S1603. In a case where the CPU 301 determines that there is no message yet to be processed, the processing proceeds to S1626.

In S1626, the CPU 301 creates a response including the processing result and sends the response to the management system 100.

As described above, the information processing apparatus 101 used in the present embodiment accepts a color profile management operation for the image forming apparatus 102, 104 from the management system 100, identifies the contents of the processing, and sends an instruction based on the contents of the processing to the image forming apparatus 102, 104. The image forming apparatus 102, 104 executes the processing by using appropriate execution means and sends the result of the processing to the information processing apparatus 101. The information processing apparatus 101 sends a response based on the received result of the processing to the management system 100. The present embodiment can achieve the same functions as the first embodiment although the image forming apparatuses 102, 104 are not directly connected to the network 105.

Third Embodiment

In the first embodiment, that color verification has not been performed for a color profile is reflected on its status by receiving an instruction to update the color profile from the management system 100 or the information processing apparatus 101. In this case, there is a possibility that the color profile that has not been subjected to color verification for a long period may be used in a case where the color profile update instruction fails to be sent due to some network trouble. In a third embodiment, a situation about performing color verification is automatically reflected on each color profile's status, and the status is updated to "available" or "unavailable" based on the result of color verification.

<Flow of Color Profile Status Update Determination Processing>

Figure 17:
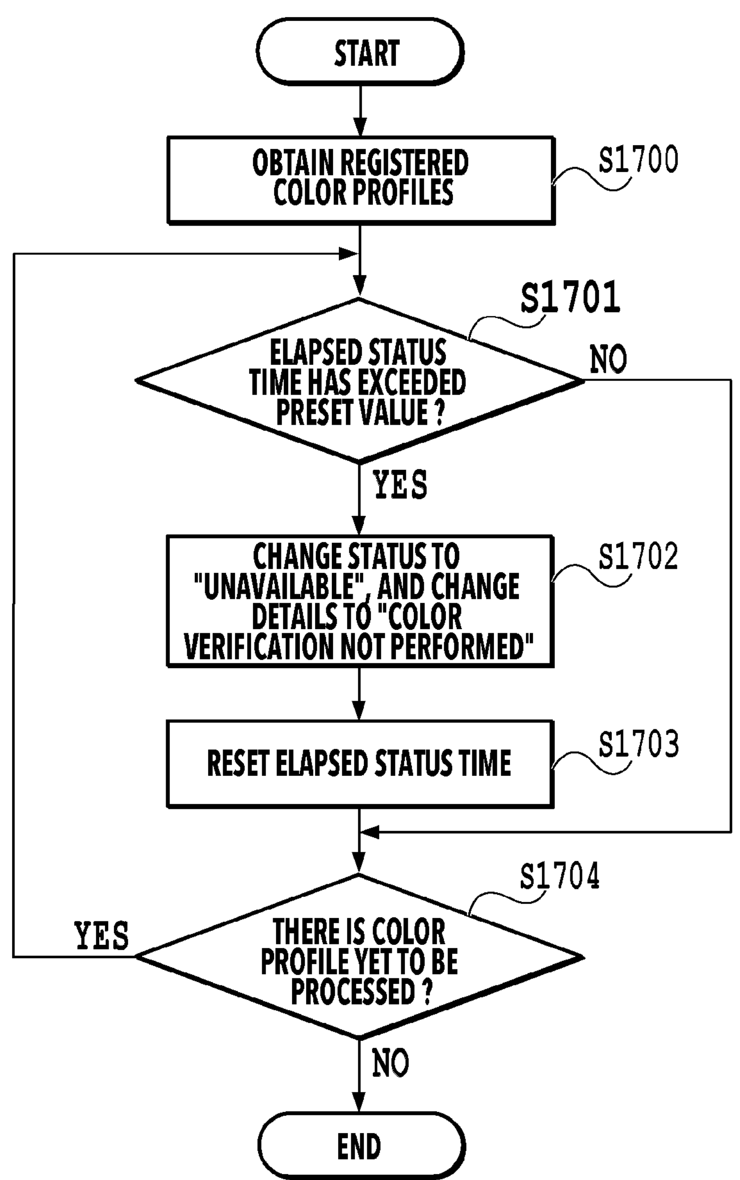
FIG. 17 is a flowchart illustrating processing which the image forming apparatus performs at predetermined time intervals.

FIG. 17 illustrates a flowchart explaining a flow of color profile status update determination processing to be performed by the resource management program 507 of the image forming apparatus 102, 104. The color profile status update determination processing is scheduled to be performed in the processing which the CPU 211 performs at preset time intervals, such as one-hour intervals.

In S1700, the CPU 211 obtains registered color profiles. This process is the same as S802. After the CPU 211 obtains the color profiles, the processing proceeds to S1701.

In S1701, the CPU 211 refers to the value of the ElapsedTime 920 and determines whether the value has exceeded a preset time. The preset time is one day, for example. In a case where the ElapsedTime 920 is in units of seconds, the CPU 211 determines whether the value has exceeded 86400. In a case where the CPU 211 determines that the value of the ElapsedTime 920 has exceeded the preset time, the processing proceeds to S1702. In a case where the CPU 211 determines that the value of the ElapsedTime 920 has not exceeded the preset time, the processing proceeds to S1704.

In S1702, the CPU 211 sets the status of the color profile as "unavailable" and sets the details of the status as "color verification not performed". Specifically, this is done by updating the value of the Status 903 to "Unavailable" and updating the value of the StatusDetails 1104 to "Unvalidated". After the CPU 211 completes the update, the processing proceeds to S1703.

In S1703, the CPU 211 resets the value of the ElapsedTime 920 to 0. After the CPU 211 executes the reset, the processing proceeds to S1704.

In S1704, the CPU 211 determines whether there is a color profile yet to be processed. In a case where the CPU 211 determines that there is a color profile yet to be processed, the processing proceeds to S1701. In a case where determining that there is no color profile yet to be processed, the CPU 211 finishes the color profile status update determination processing.

In the image forming apparatus 102, 104 according to the present embodiment, a color profile which has been determined to have color reproducibility by color verification and whose status has been updated to "available" is automatically updated to be "unavailable" in a case where a predetermined time period has elapsed without color verification performed. In this way, the image forming apparatus 102, 104 can restrict to use the color profile that has not been subjected to color verification even when not receiving a status update instruction from the management system 100.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-094986, filed Jun. 13, 2022, which is hereby incorporated by reference wherein in its entirety.

What is claimed is:

1. An image forming apparatus comprising:

a print engine configured to perform print processing by using a color profile;

a network interface configured to receive a message including a predetermined operation command related to a color profile, the message being sent from a management server system which executes color management between or among a plurality of image forming apparatuses, and being constructed in a common message format in the plurality of image forming apparatuses, the common message format conforming to a Job Messaging Format (JMF) that is usable across the plurality of image forming apparatuses; and a processor configured to execute predetermined processing related to the color profile according to the predetermined operation command included in the message received by the network interface, wherein the predetermined operation command comprises at least one of a query command for obtaining registered color profile information, a registration command for registering a new color profile or updating an availability status of the color profile, or a deletion command for deleting the color profile.

2. The image forming apparatus according to claim 1, wherein the predetermined operation command is a query, and in the predetermined processing, the processor is configured to send registered color profile information in the common message format to the management server system, the registered color profile information representing a color profile registered in the image forming apparatus.

3. The image forming apparatus according to claim 2, wherein the registered color profile information includes at least a name and a type of the color profile, a color space of the color profile in a case where the color space exists, and an availability status of the color profile.

4. The image forming apparatus according to claim 1, wherein the predetermined operation command is registration, in the predetermined processing, in a case where the message includes operation color profile information including information on a source from which the color profile is obtained, the processor is configured to obtain the color profile from the source by using the information on the source, and to newly register the color profile in the image forming apparatus, and in the predetermined processing, in a case where the message includes operation color profile information not including the information on the source from which the color profile is obtained, the processor is configured to update the availability status of the color profile included in the message and to register the resulting availability status in the image forming apparatus.

5. The image forming apparatus according to claim 4, wherein the newly registered color profile or the registered color profile after elapse of a predetermined period is registered with the availability status of the color profile set as a status indicating "unavailable".

6. The image forming apparatus according to claim 4, wherein based on color verification by the management server system, a message including an availability status indicating "available" or "unavailable" is sent to the image forming apparatus from the management server system, and the availability status of the color profile is updated and registered in the image forming apparatus.

7. The image forming apparatus according to claim 6, wherein, in a case where the availability status of the color profile is updated to "available" and registered, the color profile is enabled in the image forming apparatus.

8. The image forming apparatus according to claim 6, wherein, in a case where the availability status of the color profile is updated to "unavailable" and registered, the color profile is disabled in the image forming apparatus.

9. The image forming apparatus according to claim 1, wherein the processor is configured to determine that the predetermined operation command is a registration operation in a case where the message received by the network interface includes information on a source from which the color profile is obtained.

10. The image forming apparatus according to claim 4, wherein, in a case where the color profile information in the message received by the network interface matches registered color profile information of a color profile which has been registered since a time of shipment, the processor is configured to not execute an operation of newly registering the color profile in the image forming apparatus.

11. The image forming apparatus according to claim 1, wherein the predetermined operation command is deletion, and in the predetermined processing, the processor is configured to delete the color profile designated in the message and the registered color profile information.

12. The image forming apparatus according to claim 11, wherein, in a case where the color profile information in the message received by the network interface matches color profile information of a color profile which has been registered since a time of shipment, the processor is configured to not execute the deletion operation.

13. The image forming apparatus according to claim 11, wherein the processor is configured to not execute the deletion operation in a case where the print engine is executing print processing.

14. The image forming apparatus according to claim 1, wherein the message is received from the management server system via an information processing apparatus that is connected to the management server system through an external network and connected to the image forming apparatus through an internal network, and wherein the information processing apparatus converts the message into a device-specific operation for the image forming apparatus.

15. A method of controlling an image forming apparatus, the method comprising:

performing print processing by using a color profile;

receiving a message including a predetermined operation command related to a color profile, the message being sent from a management server system which executes color management between or among a plurality of image forming apparatuses, and being constructed in a common message format in the plurality of image forming apparatuses, the common message format conforming to a Job Messaging Format (JMF) that is usable across the plurality of image forming apparatuses; and executing predetermined processing related to the color profile according to the predetermined operation command included in the received message, wherein the predetermined operation command comprises at least one of a query command for obtaining registered color profile information, a registration command for registering a new color profile or updating an availability status of the color profile, or a deletion command for deleting the color profile.

16. A non-transitory computer readable storage medium storing a program which causes a computer to perform a method of controlling an image forming apparatus, the method comprising:

performing print processing by using a color profile;

receiving a message including a predetermined operation command related to a color profile, the message being sent from a management server system which executes color management between or among a plurality of image forming apparatuses, and being constructed in a common message format in the plurality of image forming apparatuses, the common message format conforming to a Job Messaging Format (JMF) that is usable across the plurality of image forming apparatuses; and executing predetermined processing related to the color profile according to the predetermined operation command included in the received message, wherein the predetermined operation command comprises at least one of a query command for obtaining registered color profile information, a registration command for registering a new color profile or updating an availability status of the color profile, or a deletion command for deleting the color profile.

* * * * *